(12) United States Patent
Lu et al.

(10) Patent No.: US 11,409,851 B2
(45) Date of Patent: Aug. 9, 2022

(54) AUTHENTICATION METHOD AND ELECTRONIC DEVICE

(71) Applicant: Huawei Technologies Co., Ltd., Shenzhen (CN)

(72) Inventors: Lei Lu, Wuhan (CN); Hong Duan, Wuhan (CN); Tengfei Jian, Wuhan (CN); Dongsheng Xiong, Shenzhen (CN); Qingfeng Luo, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 16/347,893

(22) PCT Filed: Jan. 23, 2017

(86) PCT No.: PCT/CN2017/072218
§ 371 (c)(1),
(2) Date: May 7, 2019

(87) PCT Pub. No.: WO2018/086259
PCT Pub. Date: May 17, 2018

(65) Prior Publication Data
US 2019/0354661 A1    Nov. 21, 2019

(30) Foreign Application Priority Data

Nov. 8, 2016  (CN) .......................... 201610981000.3

(51) Int. Cl.
*G06F 3/048* (2013.01)
*G06F 21/32* (2013.01)
(Continued)

(52) U.S. Cl.
CPC .............. *G06F 21/32* (2013.01); *G06F 3/048* (2013.01); *G06F 3/04817* (2013.01);
(Continued)

(58) Field of Classification Search
CPC ...... G06F 21/32; G06F 3/04817; G06F 3/048; G06K 9/00087; H04L 67/22; H04L 67/306

See application file for complete search history.

(56) References Cited

U.S. PATENT DOCUMENTS

| 10,693,882 B2 * | 6/2020 | Gordon ................. H04L 63/126 |
| 2008/0016371 A1 * | 1/2008 | Jiang .................. G06K 9/00013 713/186 |

(Continued)

FOREIGN PATENT DOCUMENTS

| CN | 103425914 A | 12/2013 |
| CN | 103488481 A | 1/2014 |

(Continued)

*Primary Examiner* — Xuyang Xia
(74) *Attorney, Agent, or Firm* — Slater Matsil, LLP

(57) ABSTRACT

An authentication method and an electronic device, the method including receiving a touch operation on an icon of a first application, collecting a biological feature of a user in response to the touch operation, comparing the collected biological feature with a biological feature bound to the first application, where the first application is bound to at least one biological feature, each biological feature is bound to a user account of the first application, each user account is corresponding to a resource directory, when the comparison result indicates that the collected biological feature matches a first biological feature of the at least one biological feature, determining a first user account bound to the first biological feature, and logging in to the first application based on the first user account, and loading information stored in a first resource directory corresponding to the first user account.

17 Claims, 13 Drawing Sheets

(51) Int. Cl.
*G06F 3/04817* (2022.01)
*H04L 67/50* (2022.01)
*H04L 67/306* (2022.01)
*G06V 40/12* (2022.01)

(52) U.S. Cl.
CPC .......... *G06V 40/1365* (2022.01); *H04L 67/22* (2013.01); *H04L 67/306* (2013.01)

(56) References Cited

U.S. PATENT DOCUMENTS

| | | | |
|---|---|---|---|
| 2010/0265204 A1 | 10/2010 | Tsuda | |
| 2013/0294660 A1 | 11/2013 | Heilpern | |
| 2015/0095352 A1* | 4/2015 | Lacey | H04W 4/029 707/752 |
| 2015/0347734 A1* | 12/2015 | Beigi | G06F 21/32 713/155 |
| 2016/0092018 A1 | 3/2016 | Lee et al. | |
| 2018/0089412 A1* | 3/2018 | Kopikare | G06F 21/32 |
| 2018/0107885 A1* | 4/2018 | Jo | G06K 9/00013 |

FOREIGN PATENT DOCUMENTS

| | | |
|---|---|---|
| CN | 104834848 A | 8/2015 |
| CN | 104937602 A | 9/2015 |
| CN | 105574393 A | 5/2016 |
| CN | 105678141 A | 6/2016 |
| CN | 105933546 A | 9/2016 |
| CN | 106020943 A | 10/2016 |
| EP | 2230623 A1 | 9/2010 |
| JP | 2003085149 A | 3/2003 |
| JP | 2005006259 A | 1/2005 |
| JP | 2011049876 A | 3/2011 |
| JP | 2013140440 A | 7/2013 |
| WO | 2006136106 A1 | 12/2006 |
| WO | 2013007573 A1 | 1/2013 |
| WO | 2014101856 A1 | 7/2014 |

* cited by examiner

AUTHENTICATION METHOD AND ELECTRONIC DEVICE

CROSS REFERENCE TO RELATED APPLICATIONS

This application claims priority to Chinese Patent Application No. 201610981000.3, filed with the Chinese Patent Office on Nov. 8, 2016 and entitled "APPLICATION AUTHENTICATION METHOD AND DEVICE", which is incorporated herein by reference in its entirety.

TECHNICAL FIELD

This application relates to the field of electronic information technologies, and in particular, to an authentication method and an electronic device.

BACKGROUND

With development of electronic information technologies, a growing number of electronic devices can provide an application lock function. By using the application lock function, a user of an electronic device may separately encrypt, depending on a privacy requirement or a security requirement of the user, an application installed in the electronic device.

When the user needs to open the encrypted application, in a conventional authentication manner, the user performs an operation on the encrypted application, the electronic device pops up an unlock screen, then the user enters a password or a pattern on the unlock screen, and the electronic device verifies the password or the pattern entered by the user, and logs in to the application after verification succeeds.

It can be learned that, in the conventional authentication manner, the user needs to interact with the electronic device for a plurality of times, and consequently, user operations are relatively complicated.

SUMMARY OF THE INVENTION

This application provides an authentication method and an electronic device, so as to overcome a problem that user operations are relatively complicated.

A first aspect of this application provides an authentication method, including receiving a touch operation of an operation body on an icon of a first application, collecting a biological feature of a user in response to the touch operation, comparing the collected biological feature with a biological feature bound to the first application, and logging in to the first application when a comparison result indicates that the collected biological feature matches the biological feature bound to the first application. Based on the foregoing process, when the user performs the touch operation on the icon of the first application, an electronic device directly collects the biological feature of the user without displaying an authentication screen, compares the collected biological feature with the biological feature bound to the first application, and logs in to the first application when the comparison result indicates that the collected biological feature matches the biological feature bound to the first application. Based on the foregoing process, authentication can be implemented through only one interaction between the user and the electronic device, so that user operations are simplified.

In an implementation, the first application is bound to at least one biological feature, each biological feature is bound to a user account of the first application, each user account is corresponding to a resource directory, a quantity of user accounts is the same as a quantity of biological features, and the logging in to the first application when a comparison result indicates that the collected biological feature matches the biological feature bound to the first application includes, when the comparison result indicates that the collected biological feature matches a first biological feature of the at least one biological feature, determining a first user account bound to the first biological feature, and logging in to the first application based on the first user account, so that the first application loads information stored in a first resource directory corresponding to the first user account. Based on the foregoing process, the electronic device needs only to display one icon of a double-open application on a desktop. The user performs an operation on the icon of the double-open application by using fingers with different fingerprints, so that the double-open application loads information stored in resource directories corresponding to different user accounts, and the double-open application is logged in to by using different user accounts, thereby saving desktop space and improving privacy.

In an implementation, the first application further includes a user account that is not bound to any biological feature, and the method further includes, when the comparison result indicates that the collected biological feature does not match any biological feature bound to the first application, determining a second user account that meets a preset condition and that is not bound to any biological feature, and logging in to the first application based on the second user account, so that the first application loads information stored in a second resource directory corresponding to the second user account.

In an implementation, the collecting a biological feature of a user in response to the touch operation includes controlling, in response to the touch operation, an image capture unit to capture a facial image of the user.

In another implementation, the operation body is a finger of the user, and the collecting a biological feature of a user in response to the touch operation includes collecting, at a touch operation point in response to the touch operation, a fingerprint of the finger that performs the touch operation on the icon of the first application.

A second aspect of this application provides an authentication method, including obtaining a first fingerprint of a first finger of a user that touches an icon of a first application by using a touchscreen, determining whether the first fingerprint matches a first fingerprint template bound to a first user account of the first application, if the first fingerprint matches the first fingerprint template, logging in to the first application by using the first user account, so that the first application loads a first resource directory corresponding to the first user account, obtaining a second fingerprint of a second finger of the user that touches the icon of the first application by using the touchscreen, determining whether the second fingerprint matches a second fingerprint template bound to a second user account of the first application, and if the first fingerprint matches the second fingerprint template, logging in to the first application by using the second user account, so that the first application loads a second resource directory corresponding to the second user account, where a fingerprint sensor is integrated into the touchscreen or near the touchscreen.

A third aspect of this application provides an authentication method, including receiving a touch operation of an operation body on an icon of a file library, where at least one file in the file library is bound to a pre-stored biological feature, collecting a biological feature of a user in response to the touch operation, comparing the collected biological feature with the pre-stored biological feature, and when a comparison result indicates that the collected biological feature matches the pre-stored biological feature, opening the file library, and displaying an icon of the file that is in the file library and that is bound to the pre-stored biological feature. Based on the foregoing process, the user may choose to display an encrypted file or an unencrypted file in the file library by performing only one operation on the file library each time. The user no longer needs to first find a location of a private file library, perform an operation on the private file library, and then enter a password, so that user operations are simplified.

Further, when the comparison result indicates that the collected biological feature does not match the pre-stored biological feature, the file library is opened, and an icon of a file that is in the file library and that is not bound to the pre-stored biological feature is displayed.

In an implementation, the displaying an icon of the file that is in the file library and that is bound to the pre-stored biological feature includes displaying only the icon of the file that is in the file library and that is bound to the pre-stored biological feature.

In another implementation, the displaying an icon of the file that is in the file library and that is bound to the pre-stored biological feature includes displaying the icon of the file that is in the file library and that is bound to the pre-stored biological feature, and displaying an icon of a file that is in the file library and that is not bound to any biological feature.

In an implementation, the collecting a biological feature of a user in response to the touch operation includes collecting, at a touch operation point in response to the touch operation, a fingerprint of a finger that performs the touch operation on the icon of the file library.

In another implementation, the collecting a biological feature of a user in response to the touch operation includes controlling, in response to the touch operation, an image capture unit to capture a facial image of the user.

A fourth aspect of this application provides an electronic device, including a collection module, configured to collect a biological feature of a user, a touch and display module, configured to display an image, and interact with an operation body, and a processing module, configured to receive a touch operation of the operation body on an icon of a first application, control, in response to the touch operation, the collection module to collect the biological feature of the user, compare the collected biological feature with a biological feature bound to the first application, and log in to the first application when a comparison result indicates that the collected biological feature matches the biological feature bound to the first application.

A fifth aspect of this application provides an electronic device, including an image sensor, configured to capture a facial image of a user, a touchscreen, configured to display an image, and interact with an operation body, and a processor, configured to receive a touch operation of the operation body on an icon of a first application, control, in response to the touch operation, the image sensor to capture the facial image of the user, compare the captured facial image with a facial image bound to the first application, and log in to the first application when a comparison result indicates that the captured facial image matches the facial image bound to the first application.

A sixth aspect of this application provides an electronic device, including a touchscreen, where a fingerprint sensor is integrated into the touchscreen, and the touchscreen is configured to display an image and interact with a finger of a user, and is capable of collecting a fingerprint of the user, and a processor, configured to receive a touch operation of the finger of the user on an icon of a first application, control, in response to the touch operation, the touchscreen to collect a fingerprint of the finger that performs the touch operation on the icon of the first application, compare the collected fingerprint with a fingerprint bound to the first application, and log in to the first application when a comparison result indicates that the collected fingerprint matches the fingerprint bound to the first application.

A seventh aspect of this application provides an electronic device, including a collection module, configured to collect a biological feature of a user, a touch and display module, configured to display an image, and interact with an operation body, and a processing module, configured to receive a touch operation of the operation body on an icon of a file library, where at least one file in the file library is bound to a pre-stored biological feature, control, in response to the touch operation, the collection module to collect the biological feature of the user, compare the collected biological feature with the pre-stored biological feature, and when a comparison result indicates that the collected biological feature matches the pre-stored biological feature, open the file library, and control the touch and display module to display an icon of the file that is in the file library and that is bound to the pre-stored biological feature.

An eighth aspect of this application provides an electronic device, including an image sensor, configured to capture a facial image of a user, a touchscreen, configured to display an image, and interact with an operation body, and a processor, configured to receive a touch operation of the operation body on an icon of a file library, where at least one file in the file library is bound to a pre-stored facial image, control, in response to the touch operation, the image sensor to capture the facial image of the user, compare the captured facial image with the pre-stored facial image, and when a comparison result indicates that the captured facial image matches the pre-stored facial image, open the file library, and control the touchscreen to display an icon of the file that is in the file library and that is bound to the pre-stored facial image.

A ninth aspect of this application provides an electronic device, including a touchscreen, where a fingerprint sensor is integrated into the touchscreen, and the touchscreen is configured to display an image and interact with a finger of a user, and is capable of collecting a fingerprint of the user, and a processor, configured to receive a touch operation of the finger of the user on an icon of a file library, where at least one file in the file library is bound to a pre-stored fingerprint, control, in response to the touch operation, the touchscreen to collect a fingerprint of the finger that performs the touch operation on the icon of the file library, compare the collected fingerprint with the pre-stored fingerprint, when a comparison result indicates that the collected fingerprint matches the pre-stored fingerprint, open the file library, and control the touchscreen to display an icon of the file that is in the file library and that is bound to the pre-stored fingerprint.

DETAILED DESCRIPTION OF ILLUSTRATIVE EMBODIMENTS

The embodiments in this specification are all described in a progressive manner. For same or similar parts in the embodiments, reference may be made to these embodiments, and each embodiment focuses on a difference from other embodiments.

A basic concept of an authentication method provided in the embodiments of this application is, when a user performs a touch operation on an application, an electronic device directly collects a biological feature of the user without displaying an unlock screen, compares the collected biological feature with a biological feature bound to the application that is touched by the user, and when a comparison result indicates that the collected biological feature matches the biological feature bound to the application that is touched by the user, it indicates that authentication succeeds, and the application is directly logged in to. To be specific, according to the authentication method provided in the embodiments of this application, an encrypted application can be logged in to through only one interaction between the user and the electronic device, so that user operations are simplified.

Based on the foregoing basic concept, in the embodiments of this application, when the user wants to start an application lock to encrypt one or more applications in the electronic device, the applications may be encrypted by using a biological feature such as a fingerprint or a facial image. The following describes, by using a fingerprint as an example, an implementation process of encrypting an application.

First, a user may operate, by using a touchscreen, a button that is used to trigger an application lock function, to activate a fingerprint sensor. To be specific, an electronic device activates the fingerprint sensor in response to a touch operation on a preset button. The button may be a virtual button displayed by the electronic device.

After the fingerprint sensor is activated, the electronic device may output prompt information, to prompt the user to enter a fingerprint.

Figure 1:
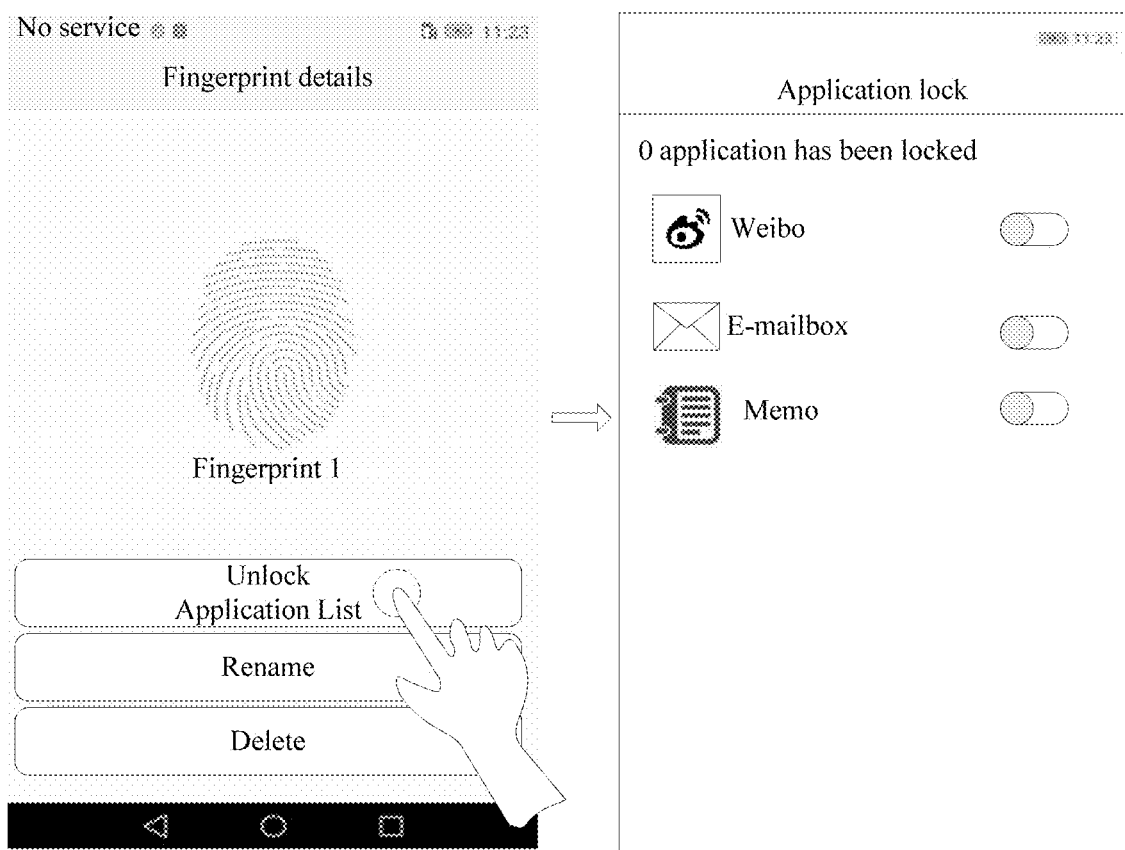
FIG. 1 is a diagram of an example in which a user selects an application by interacting with an electronic device after the user enters a fingerprint by using a fingerprint sensor according to an embodiment of this application.

After the user enters a fingerprint by using the fingerprint sensor, the electronic device may directly display an application list. Alternatively, after the user enters a fingerprint by using the fingerprint sensor, the electronic device may display a schematic diagram of a fingerprint, to indicate that the user has entered the fingerprint, and display a button that is used to trigger display of an application list. After the user operates, by using the touchscreen, the button that is used to trigger display of an application list, the application list is displayed, and the user selects an application from the application list for encryption. FIG. 1 is a diagram of an example in which a user selects an application by interacting with an electronic device after the user enters a fingerprint by using a fingerprint sensor. A left figure of FIG. 1 is a diagram of an example of a page displayed by the electronic device after the user enters the fingerprint by using the fingerprint sensor. In the example, the button that is used to trigger display of an application list is an "Unlock Application List" button. After the user operates the "Unlock Application List" button by using a touchscreen, the application list is displayed. A diagram of an example of a displayed application list is shown in a right figure of FIG. 1. After the application list is displayed, the user may select one application, or select two or more applications.

After the user selects an application, the electronic device stores the collected fingerprint, and binds the collected fingerprint to the application selected by the user, so that the application is encrypted by using the fingerprint. Specifically, the collected fingerprint may be bound to a user account of the application selected by the user.

Certainly, a process of encrypting the application by using the fingerprint is not limited to the foregoing implementation, and there may be another implementation, provided that the user fingerprint can be collected and the collected fingerprint can be bound to the application selected by the user.

In the foregoing embodiment, when needing to encrypt an application, the user instantly enters a fingerprint that is used to encrypt the application. In another optional embodiment, the user may not need to instantly enter a fingerprint, but encrypt an application by using a pre-stored fingerprint that is used to unlock a screen of the electronic device. For example, when wanting to start the application lock, the user may operate, by using the touchscreen, the button that is used to trigger an application lock function, to trigger the electronic device to display an application list, and the user selects an application from the application list for encryption. After the user selects at least one application, the application selected by the user is bound to the foregoing pre-stored fingerprint that is used to unlock a screen of the electronic device, so that the application is encrypted by using the fingerprint. To be specific, the same fingerprint is used for application encryption and screen locking.

A process of encrypting an application by using a facial image is similar to the foregoing process of encrypting the application by using the fingerprint, and details are not described herein again.

After an application lock function is enabled for an application by using a biological feature, when the application needs to be logged in to, an authentication method provided in an embodiment of this application is as follows.

Figure 2:
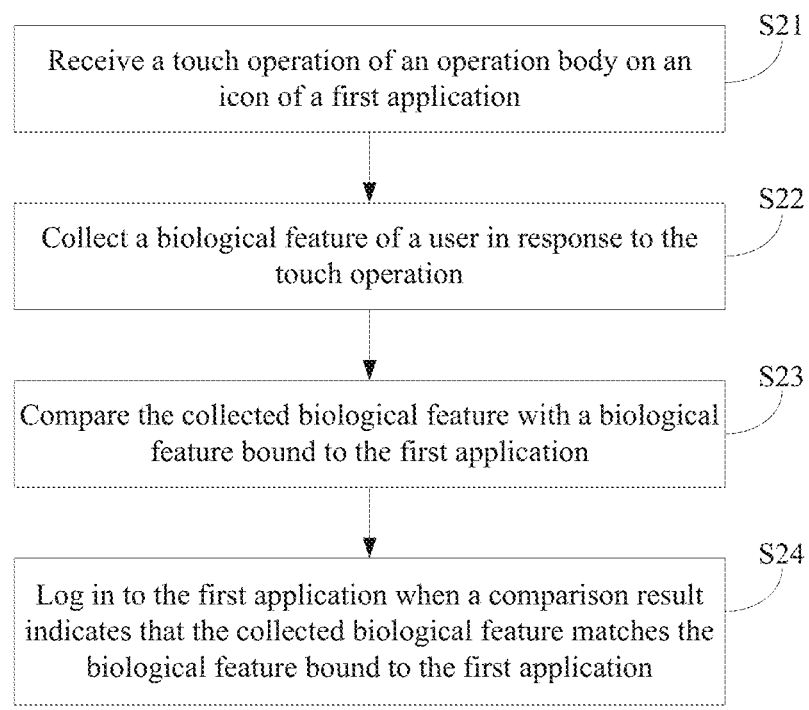
FIG. 2 is a flowchart of implementing an authentication method according to an embodiment of this application.

Referring to FIG. 2, FIG. 2 is a flowchart of implementing an authentication method according to an embodiment of this application. The authentication method may include the following steps.

Step S21: Receive a touch operation of an operation body on an icon of a first application.

An electronic device displays the icon of the first application by using a touchscreen. The operation body may be a device, such as a stylus, that is used cooperatively with the electronic device, or a finger of a user. The first application is an application that is encrypted by using a biological feature of the user. In other words, the first application is bound to the biological feature of the user.

In an embodiment of this application, the first application may be an application program, such as WeChat, Weibo, QQ, and E-mailbox.

It should be noted that the authentication method not only can be used to perform authentication on an application, but also can be used to perform authentication on a file, such as a file library mentioned in the following specification. The file library may include a folder, a document, a picture, audio, a video, and the like, and the folder may store at least one of the following files, including a sub-folder, a document, a picture, audio, a video, and the like.

Step S22: Collect a biological feature of a user in response to the touch operation.

In an embodiment of this application, the biological feature of the user may be a fingerprint of the user or a facial feature of the user. Specifically, if the user encrypts an application in advance by using a fingerprint, the fingerprint of the user is collected in this case, or if the user encrypts an application in advance by using a facial image of the user, the facial image of the user is collected in this case.

If the fingerprint of the user is collected, the touchscreen of the electronic device may be a touchscreen into which a fingerprint sensor is integrated. In this case, the user performs the touch operation on the icon of the first application on the touchscreen by using the finger. When the user touches, by using the finger, a location, on the touchscreen, for displaying the icon of the first application, the touchscreen collects, at a touch point, a fingerprint of the finger that performs the touch operation on the icon of the first application.

If the facial feature of the user is collected, the user may touch the icon of the first application on the touchscreen by using the finger, or touch the icon of the first application on the touchscreen by using a stylus. In this case, an image capture unit, such as a front-facing camera of the electronic device, may be used to capture the facial feature of the user.

Step S23: Compare the collected biological feature with a biological feature bound to the first application.

Step S24: Log in to the first application when a comparison result indicates that the collected biological feature matches the biological feature bound to the first application.

In an optional embodiment, the logging in to the first application may include displaying a user account and password entry screen. In this case, the user needs to enter a user account and a password corresponding to the user account, and then trigger the electronic device to load a resource directory corresponding to the user account entered by the user.

In another optional embodiment, the logging in to the first application may include displaying an account and password entry screen. On the screen, an account entry box stores a user account that is used by the user for logging in to the first application last time. In this case, the user needs only to enter, in a password entry box, a password corresponding to the user account in the account entry box, and then trigger the electronic device to load a resource directory corresponding to the user account stored in the account entry box.

In still another optional embodiment, the logging in to the first application may include directly loading, based on a user account and a password that are stored, a resource directory corresponding to the stored user account. In this embodiment, the user does not need to enter a user account or a password.

If the comparison result indicates that the collected biological feature does not match the biological feature bound to the first application, prompt information may be output, to prompt the user that authentication fails.

For example, the biological feature is a fingerprint. The electronic device displays the icon of the first application by using the touchscreen. After the user performs the touch operation on the icon of the first application by using the finger, the electronic device collects, by using the fingerprint sensor integrated into the touchscreen, the fingerprint of the finger of the user that touches the icon of the first application, compares the collected fingerprint with a fingerprint bound to the first application, and logs in to the first application if the collected fingerprint matches the fingerprint bound to the first application, or does not log in to the first application if the collected fingerprint does not match the fingerprint bound to the first application.

According to the authentication method, when the user performs the touch operation on the icon of the first application, the biological feature of the user is directly collected without displaying an authentication screen, the collected biological feature is compared with the biological feature bound to the first application, and the first application is logged in to when the comparison result indicates that the collected biological feature matches the biological feature bound to the first application. Based on the foregoing process, authentication can be implemented through only one interaction between the user and the electronic device, so that user operations are simplified.

During implementation of this application, an inventor further finds that a user may sign up with two user accounts when using an application. Therefore, after the user uses one user account to log in to the application, if the user expects to use the other user account to log in to the application, the user needs to first exit the user account that has been used for login, and then use the other user account to log in to the application again. In other words, the two user accounts cannot be simultaneously used for login, and this brings inconvenience to usage of the user. To resolve the problem, operating systems of a growing number of electronic devices support a double-open application. To be specific, the operating systems support simultaneously running two processes of one application, and different processes are corresponding to different user accounts. If the user needs to use the double-open application, an electronic device needs to display two icons on a desktop, each icon is corresponding to one user account, different user accounts are corresponding to different resource directories, the two resource directories are independent of each other, and the resource directories are used to store related information required for running the application. When the user performs an operation on any one icon of the double-open application, the electronic device calls, based on a user account corresponding to the operated icon, a process corresponding to the operated icon, and loads, by using the process, a resource directory corresponding to the user account corresponding to the operated icon, so that the user can log in to the other user account without exiting the user account. On this basis, if an operating system of the electronic device supports a multi-open application, the electronic device needs to display more icons on the desktop, and this occupies relatively much desktop space. In addition, another person can see that the user has two user accounts or more user accounts, and privacy is relatively poor.

To resolve a problem that a double-open application occupies relatively much desktop space and is poor in privacy, an embodiment of this application provides a double-open application encryption method. A main concept of the double-open application encryption method is that different user accounts of a double-open application are encrypted by using different fingerprints. Therefore, only one icon of the double-open application may be displayed on a desktop, so that desktop space is saved and privacy is improved. When operating a same application icon by using fingers with different fingerprints, a user may log in to the application by simultaneously using different user accounts.

Based on the foregoing encryption concept, an implementation of the double-open application encryption method provided in this embodiment of this application may include the following.

First, the user may operate, by using a touchscreen, a button that is used to trigger a double-open application encryption function, to activate a fingerprint sensor. To be specific, an electronic device activates the fingerprint sensor in response to a touch operation on a preset button. The button may be a virtual button displayed by the electronic device.

After the fingerprint sensor is activated, the electronic device may output prompt information, to prompt the user to enter a fingerprint.

Figure 3:
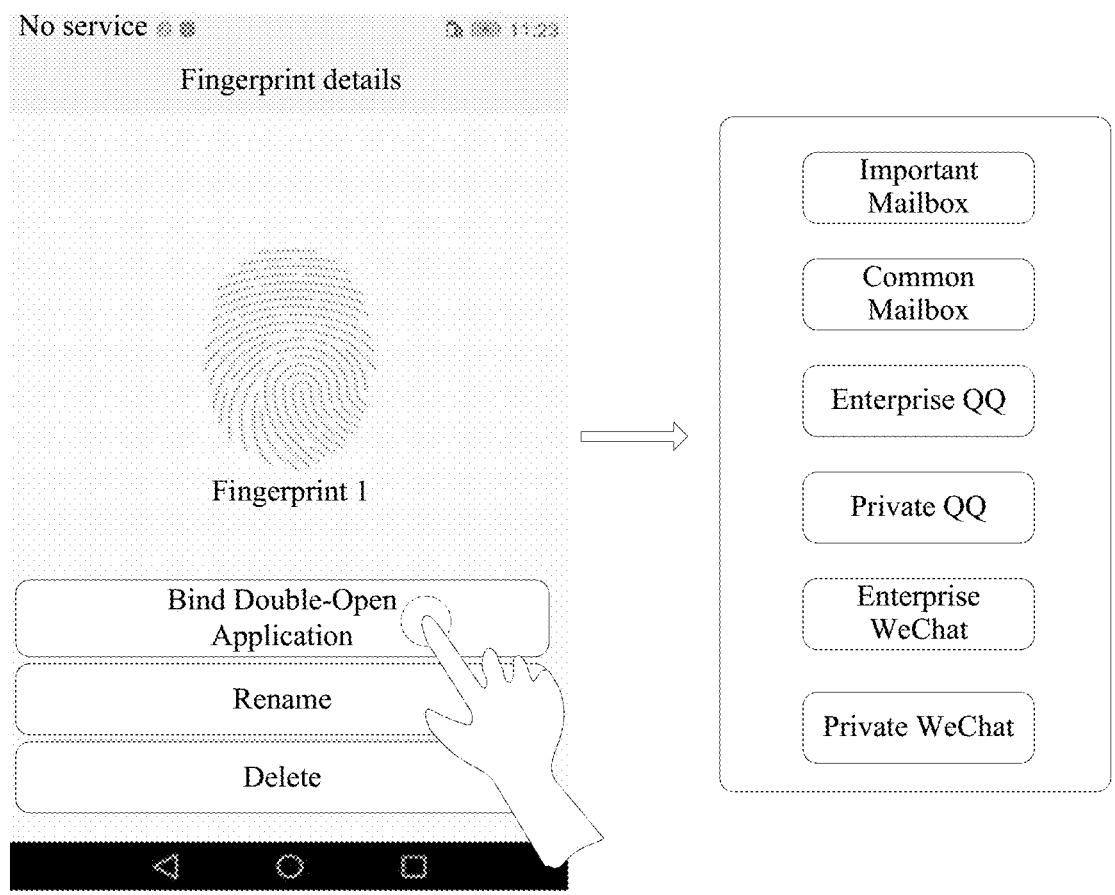
FIG. 3 is another diagram of an example in which a user selects an application by interacting with an electronic device after the user enters a fingerprint by using a fingerprint sensor according to an embodiment of this application.

After the user enters a fingerprint by using the fingerprint sensor, the electronic device may directly display a double-open application list. Alternatively, after the user enters a fingerprint by using the fingerprint sensor, the electronic device may display a schematic diagram of a fingerprint, to indicate that the user has entered the fingerprint, and display a button that is used to trigger display of a double-open application list. After the user operates, by using the touchscreen, the button that is used to trigger display of a double-open application list, the double-open application list is displayed. Identification information of all user accounts of all double-open applications may be displayed in the double-open application list. The identification information may include a name of a double-open application and all user accounts of the double-open application in the electronic device, or the identification information may include a name of a double-open application and identifiers of all user accounts of the double-open application in the electronic device, where the identifiers are set by the user for convenience of distinguishing different user accounts. After the double-open application list is displayed, the user selects one user account of a double-open application from the application list for encryption. FIG. 3 is another diagram of an example in which a user selects an application by interacting with an electronic device after the user enters a fingerprint by using a fingerprint sensor. A left figure of FIG. 3 is a diagram of an example of a page displayed by the electronic device after the user enters the fingerprint by using the fingerprint sensor. In the example, the button that is used to trigger display of a double-open application list is a "Bind Double-Open Application" button. After the user operates the "Bind Double-Open Application" button by using a touchscreen, an application list is displayed. The displayed double-open application list is shown in a right figure of FIG. 3. In the example shown in FIG. 3, double-open applications include Mailbox, QQ, and WeChat. After the double-open application list is displayed, the user may select one user account of one double-open application. For example, the user may select only "Enterprise WeChat". The user may alternatively select one user account separately from at least some double-open applications. For example, the user may select "Enterprise WeChat" and "Important Mailbox", or the user may select "Enterprise WeChat", "Important Mailbox", and "Enterprise QQ".

After the user selects the user account, the collected fingerprint is bound to the user account selected by the user, so that one user account of a double-open application is encrypted by using one fingerprint.

Refer to the foregoing process for a process of encrypting the other user account of the double-open application, but the user enters a fingerprint different from the previous one during fingerprint entry, and after the double-open application list is displayed, the user selects a user account that is not selected in a previous time.

Certainly, the process of encrypting the double-open application by using a fingerprint is not limited to the foregoing implementation, and there may be another implementation, provided that the user fingerprint can be collected and the collected fingerprint can be bound to the user account of the double-open application.

In an optional embodiment, the user may choose to encrypt all user accounts of the double-open application, or choose to encrypt some user accounts of the double-open application. For example, for WeChat in FIG. 3, the user may choose to encrypt only "Enterprise WeChat" without encrypting "Private WeChat".

In addition, because different user accounts of the double-open application are corresponding to different resource directories, binding the fingerprint to the user account is equivalent to binding the fingerprint to a resource directory corresponding to the user account.

After a double-open application encryption function is enabled for a double-open application by using a fingerprint, when the double-open application needs to be logged in to by using one user account of the double-open application, an authentication method provided in an embodiment of this application is as follows.

Figure 4:
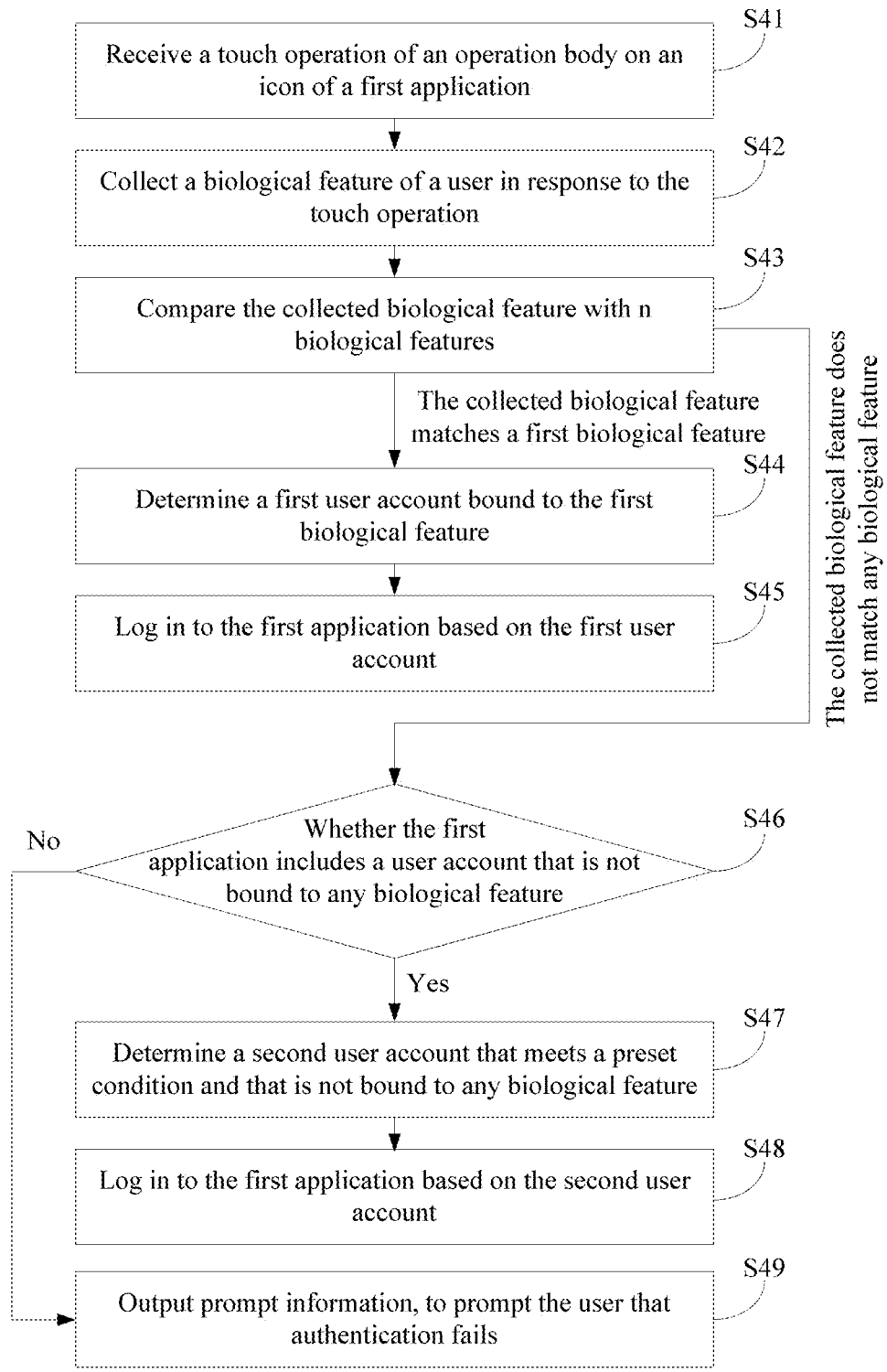
FIG. 4 is another flowchart of implementing an authentication method according to an embodiment of this application.

Referring to FIG. 4, FIG. 4 is another flowchart of implementing an authentication method according to an embodiment of this application. The authentication method may include the following steps.

Step S41: Receive a touch operation of an operation body on an icon of a first application, where the operation body may be a finger of a user. The first application is bound to n biological features, the first application includes m user accounts, and each user account is corresponding to a resource directory. To be specific, the first application includes m resource directories, the m resource directories are independent of each other, and different user accounts are corresponding to different resource directories. n is a positive integer greater than or equal to 1, m is a positive integer greater than or equal to n, n user accounts of the m user accounts are bound to the n biological features in a one-to-one manner.

Step S42: Collect a biological feature of the user in response to the touch operation. When the user performs the touch operation on the icon of the first application by using the finger, a fingerprint of the finger that performs the touch operation on the icon of the first application is collected at a touch location on a touchscreen.

Step S43: Compare the collected biological feature with the n biological features. If a comparison result indicates that the collected biological feature matches a first biological feature of the n biological features, step S44 is performed, or if a comparison result indicates that the collected biological feature does not match any one biological feature of the n biological features, step S46 is performed.

Step S44: Determine a first user account bound to the first biological feature.

Step S45: Log in to the first application based on the first user account, so that the first application loads information stored in a first resource directory corresponding to the first user account.

Specifically, a corresponding process may be called based on the first user account, and the information stored in the first resource directory is loaded by using the process.

Step S46: Determine whether the first application includes a user account that is not bound to any biological feature. If yes, step S47 is performed, and if no, step S49 is performed.

When m is greater than n, the first application not only includes the user account bound to the biological feature, but also includes the user account that is not bound to any biological feature. If m is equal to n, the first application does not include the user account that is not bound to any biological feature.

Step S47: Determine a second user account that meets a preset condition and that is not bound to any biological feature.

In an optional embodiment, a user account that is most frequently used for login may be determined as the second user account based on a historical login record of the user account that is not bound to any biological feature.

In another optional embodiment, a user account that is most recently loaded may be determined as the second user account based on a historical login record of the user account that is not bound to any biological feature.

In still another optional embodiment, an identifier list of all user accounts that are not bound to any biological feature may be displayed, all the user accounts that are not bound to any biological feature may be displayed in the identifier list, and the user selects a user account as the second user account based on an identifier.

Step S48: Log in to the first application based on the second user account, so that the first application loads information stored in a second resource directory corresponding to the second user account.

Specifically, a corresponding process may be called based on the second user account, and the information stored in the second resource directory is loaded by using the process.

Step S49: Output prompt information, to prompt the user that authentication fails.

In an optional embodiment, after the first application is logged in to based on the first user account, if the user performs a touch operation on the icon of the first application by using another finger, a fingerprint of the another finger is collected at a touch point. If the collected fingerprint matches a second biological feature, the first application is logged in to based on a third user account bound to the second biological feature, so that the first application loads information stored in a third resource directory corresponding to the third user account. In this case, the first application is logged in to by simultaneously using the first user account and the third user account.

In another optional embodiment, after the first application is logged in to based on the second user account, if the user performs a touch operation on the icon of the first application by using another finger, a fingerprint of the another finger is collected at a touch point. If the collected fingerprint matches a second biological feature, the first application is logged in to based on a third user account bound to the second biological feature, so that the first application loads information stored in a third resource directory corresponding to the third account. In this case, the first application is logged in to by simultaneously using the second user account and the third user account.

In an optional embodiment, if the first application includes only two user accounts, and the first application is bound to only one biological feature, and specifically, the biological feature is bound to the first user account of the two user accounts, the authentication method provided in this embodiment of this application may be receiving a touch operation of an operation body on an icon of a first application, where the operation body may be a finger of a user, collecting a biological feature of the user in response to the touch operation, where when the user performs the touch operation on the icon of the first application by using the finger, a fingerprint of the finger that performs the touch operation on the icon of the first application is collected at a touch location on a touchscreen, comparing the collected biological feature with a biological feature bound to a first user account, and if a comparison result indicates that the collected biological feature matches the biological feature bound to the first user account, logging in to the first application based on the first user account, so that the first application loads information stored in a first resource directory corresponding to the first user account.

After the first application is logged in to based on the first user account, if the user performs a touch operation on the icon of the first application by using another finger, because a fingerprint of the another finger does not match a fingerprint bound to the first user account, the first application is logged in to based on a second user account of the foregoing two user accounts, so that the first application loads information stored in a second resource directory corresponding to the second user account. The second user account is a user account of the foregoing two user accounts that is not bound to any biological feature. An objective of logging in to a same application by simultaneously using two user accounts is achieved by using different operations on one icon.

If a comparison result indicates that the collected biological feature does not match the biological feature bound to the first user account, the first application is logged in to based on a second user account of the foregoing two user accounts, so that the first application loads information stored in a second resource directory corresponding to the second user account. The second user account is a user account of the foregoing two user accounts that is not bound to any biological feature.

Similarly, after the first application is logged in to based on the second user account, if the user performs a touch operation on the icon of the first application by using a finger with an encrypted fingerprint, because the fingerprint of the finger matches a fingerprint bound to the first user account, the first application is logged in to based on the first user account, so that the first application loads information stored in a first resource directory corresponding to the first user account. An objective of logging in to a same application by simultaneously using two user accounts is also achieved by using different operations on one icon.

Figure 5A:
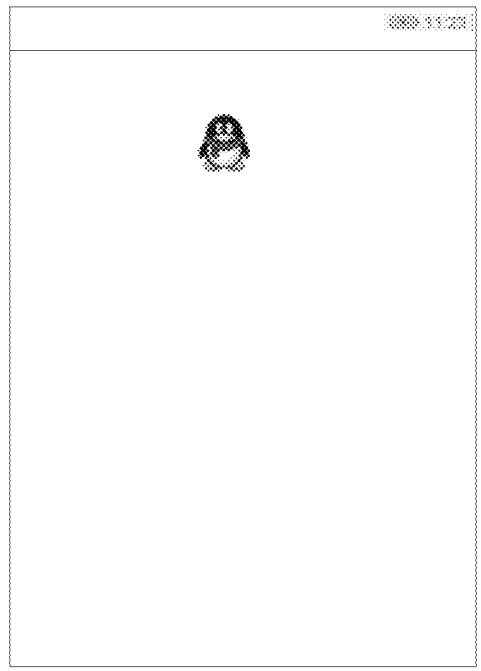
FIG. 5a is a diagram of an example of an icon that is of a first application and that is displayed by an electronic device by using a touchscreen according to an embodiment of this application.
Figure 5B:
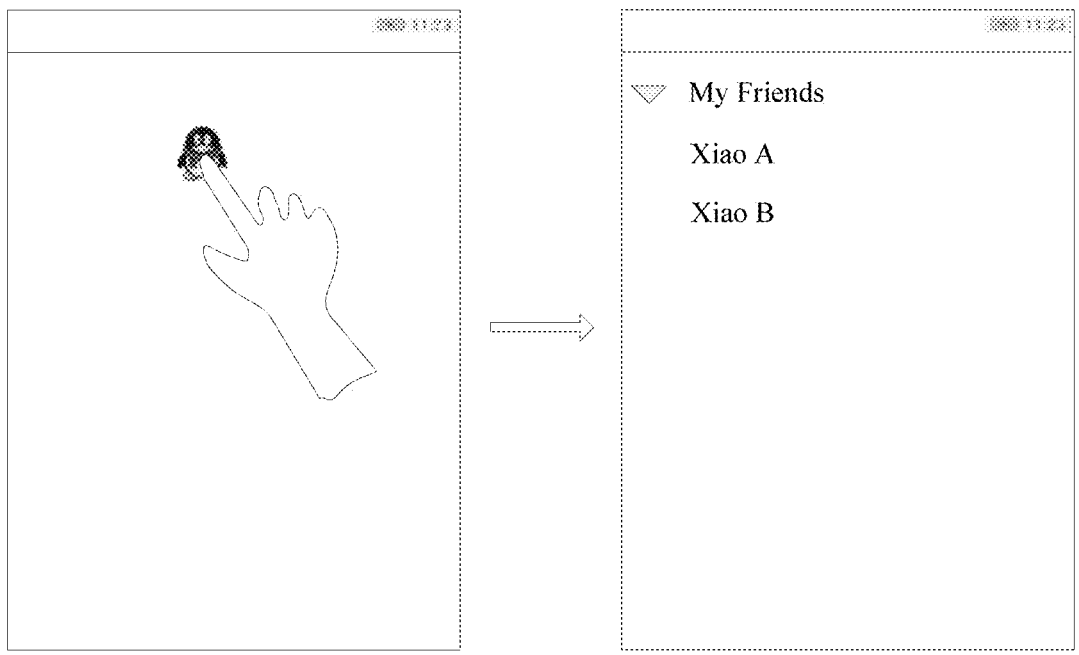
FIG. 5b is a diagram of an example in which a user interacts with an electronic device by using a right hand index finger according to an embodiment of this application.

An example is used for description. It is assumed that an icon that is of a first application and that is displayed by an electronic device by using a touchscreen is shown in FIG. 5a. In the example, the first application is QQ. The first application is corresponding to three user accounts: a first user account, a second user account, and a third user account. The first user account is bound to a fingerprint of a right hand index finger of a user, the second user account is bound to a fingerprint of a right hand middle finger of the user, and the third user account is bound to a fingerprint of a right hand ring finger of the user. Therefore, As shown in FIG. 5b, FIG. 5b is a diagram of an example in which a user interacts with an electronic device by using a right hand index finger. When the user touches the icon of the first application by using the right hand index finger, the electronic device collects a fingerprint of the right hand index finger by using a fingerprint sensor integrated into the touchscreen, compares the collected fingerprint with the foregoing three fingerprints, and when a comparison result indicates that the collected fingerprint matches the fingerprint bound to the first user account, logs in to the first application by using the first user account. In this case, the first application loads information stored in a resource directory corresponding to the first user account. After the first application loads the information stored in the resource directory corresponding to the first user account, a displayed screen, for example, a "My Friends" screen, is shown in a right figure of FIG. 5b.

Figure 5C:
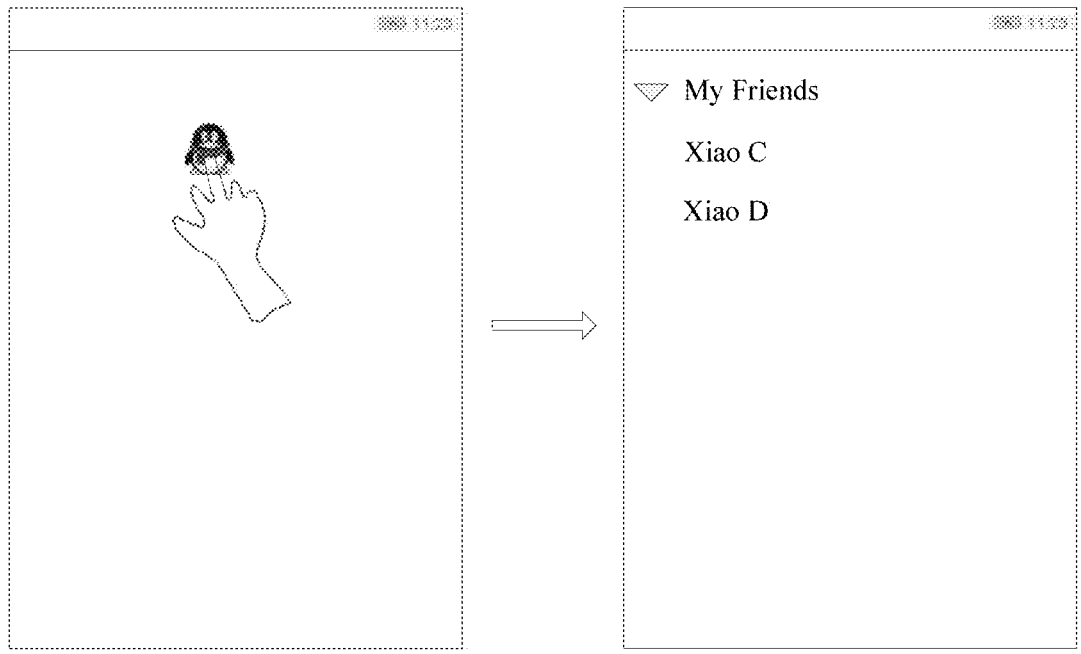
FIG. 5c is a diagram of an example in which a user interacts with an electronic device by using a right hand middle finger according to an embodiment of this application.

As shown in FIG. 5c, FIG. 5c is a diagram of an example in which a user interacts with an electronic device by using a right hand middle finger. When the user touches the icon of the first application by using the right hand middle finger, the electronic device collects a fingerprint of the right hand middle finger by using a fingerprint sensor integrated into the touchscreen, compares the collected fingerprint with the foregoing three fingerprints, and when a comparison result indicates that the collected fingerprint matches the fingerprint bound to the second user account, logs in to the first application by using the second user account. In this case, the first application loads information stored in a resource directory corresponding to the second user account. After the first application loads the information stored in the resource directory corresponding to the second user account, a displayed "My Friends" screen is shown in a right figure of FIG. 5c.

Figure 5D:
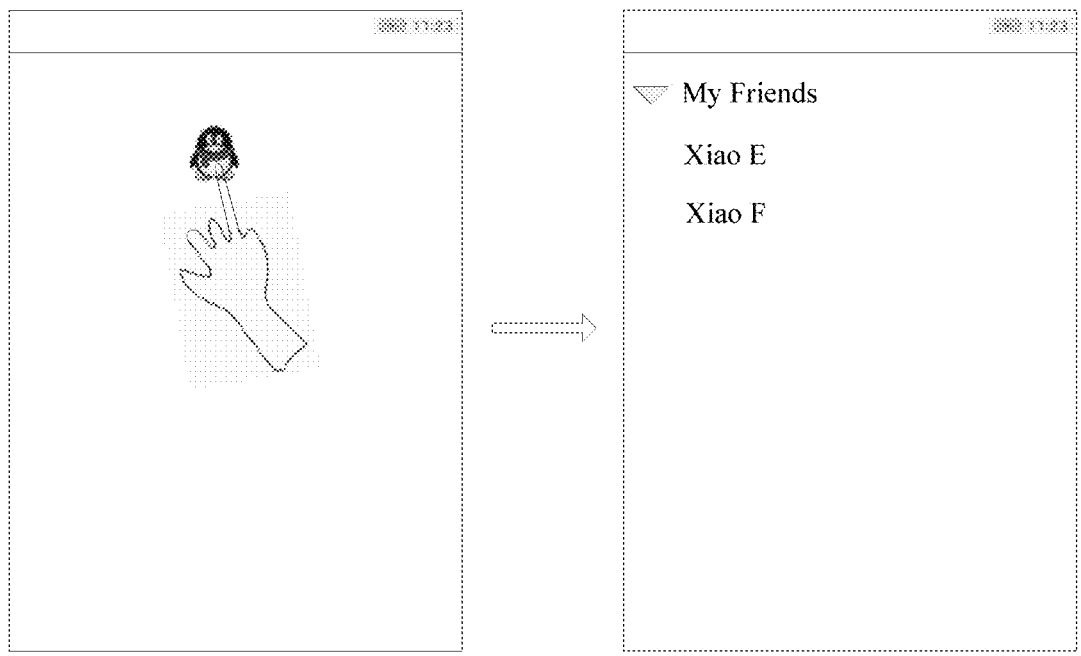
FIG. 5d is a diagram of an example in which a user interacts with an electronic device by using a right hand ring finger according to an embodiment of this application.

As shown in FIG. 5d, FIG. 5d is a diagram of an example in which a user interacts with an electronic device by using a right hand ring finger. When the user touches the icon of the first application by using the right hand ring finger, the electronic device collects a fingerprint of the right hand ring finger by using a fingerprint sensor integrated into the touchscreen, compares the collected fingerprint with the foregoing three fingerprints, and when a comparison result indicates that the collected fingerprint matches the fingerprint bound to the third user account, logs in to the first application by using the third user account. In this case, the first application loads information stored in a resource directory corresponding to the third user account. After the first application loads the information stored in the resource directory corresponding to the third user account, a displayed "My Friends" screen is shown in a right figure of FIG. 5d.

Apparently, what is displayed in FIG. 5b, FIG. 5c, and FIG. 5d is contact information of different user accounts.

Another example is used for description, and description is provided by still using the icon of the first application shown in FIG. 5a as an example. In the example, the first application is corresponding to three user accounts: a first user account, a second user account, and a third user account. The first user account is bound to a fingerprint of a right hand index finger of a user, the second user account is bound to a fingerprint of a left hand index finger of the user, and the third account is not bound to any fingerprint. Therefore, Refer to the example shown in FIG. 5b for a process in which the user interacts with the electronic device by using the right hand index finger, and details are not described herein again.

Figure 5E:
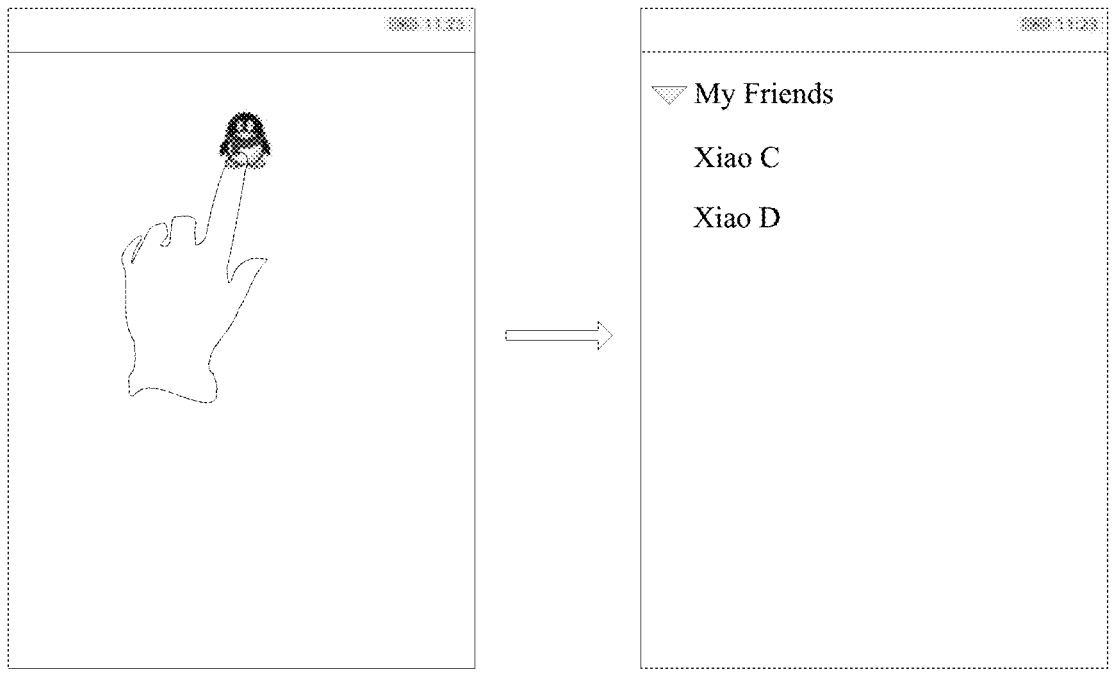
FIG. 5e is a diagram of an example in which a user interacts with an electronic device by using a left hand index finger according to an embodiment of this application.

As shown in FIG. 5e, FIG. 5e is a diagram of an example in which a user interacts with an electronic device by using a left hand index finger. When the user touches the icon of the first application by using the left hand index finger, the electronic device collects a fingerprint of the left hand index finger by using a fingerprint sensor integrated into the touchscreen, compares the collected fingerprint with the foregoing three fingerprints, and when a comparison result indicates that the collected fingerprint matches the fingerprint bound to the second user account, logs in to the first application by using the second user account. In this case, the first application loads information stored in a resource directory corresponding to the second user account. After the first application loads the information stored in the resource directory corresponding to the second user account, a displayed "My Friends" screen is shown in a right figure of FIG. 5e.

Figure 5F:
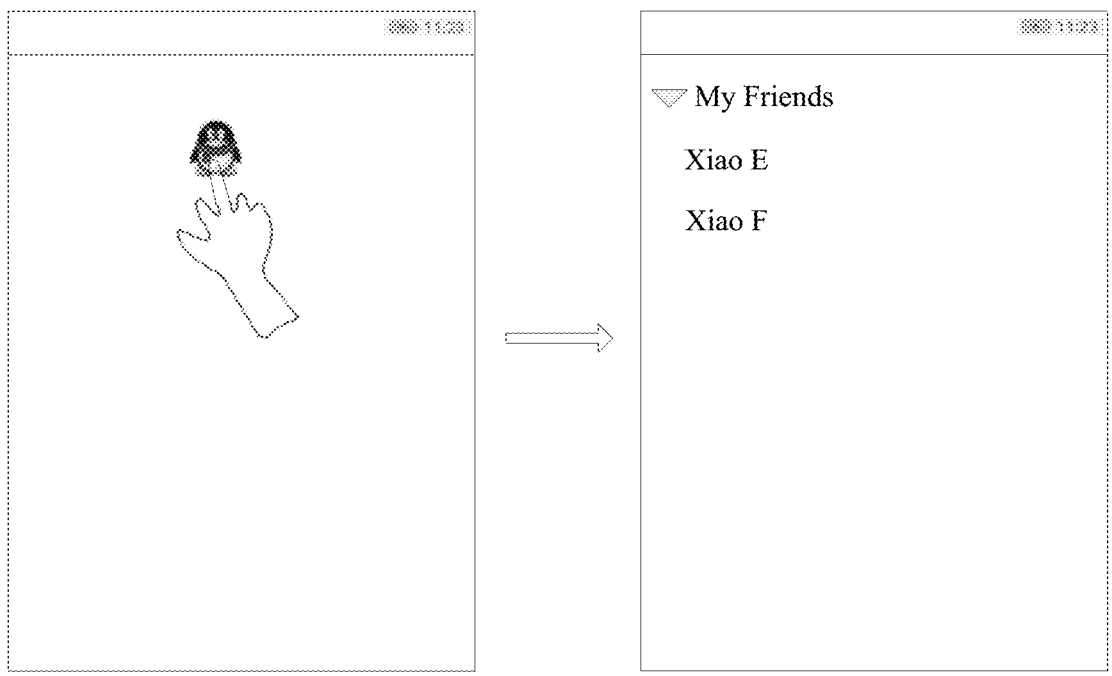
FIG. 5f is another diagram of an example in which a user interacts with an electronic device by using a right hand middle finger according to an embodiment of this application.

As shown in FIG. 5f, FIG. 5f is another diagram of an example in which a user interacts with an electronic device by using a right hand middle finger. When the user touches the icon of the first application by using the right hand middle finger, the electronic device collects a fingerprint of the right hand middle finger by using a fingerprint sensor integrated into the touchscreen, compares the collected fingerprint with the foregoing three fingerprints, and when a comparison result indicates that the collected fingerprint neither matches the fingerprint bound to the first user account nor matches the fingerprint bound to the second user account, logs in to the first application by using the third user account. In this case, the first application loads information stored in a resource directory corresponding to the third user account. After the first application loads the information stored in the resource directory corresponding to the third user account, a displayed "My Friends" screen is shown in a right figure of FIG. 5f. It should be noted that the example shown in FIG. 5f is also applicable to a scenario of interacting with the electronic device by using a finger instead of the right hand index finger and the left hand index finger.

Still another example is used for description, and description is provided by still using the icon of the first application shown in FIG. 5a as an example. In the example, the first application is corresponding to three user accounts: a first user account, a second user account, and a third user account. Only the first user account is bound to a fingerprint of a right hand index finger of a user, and neither the second user account nor the third user account is bound to any fingerprint. Therefore, Refer to the example shown in FIG. 5b for a process in which the user interacts with the electronic device by using the right hand index finger, and details are not described herein again.

Figure 5G:
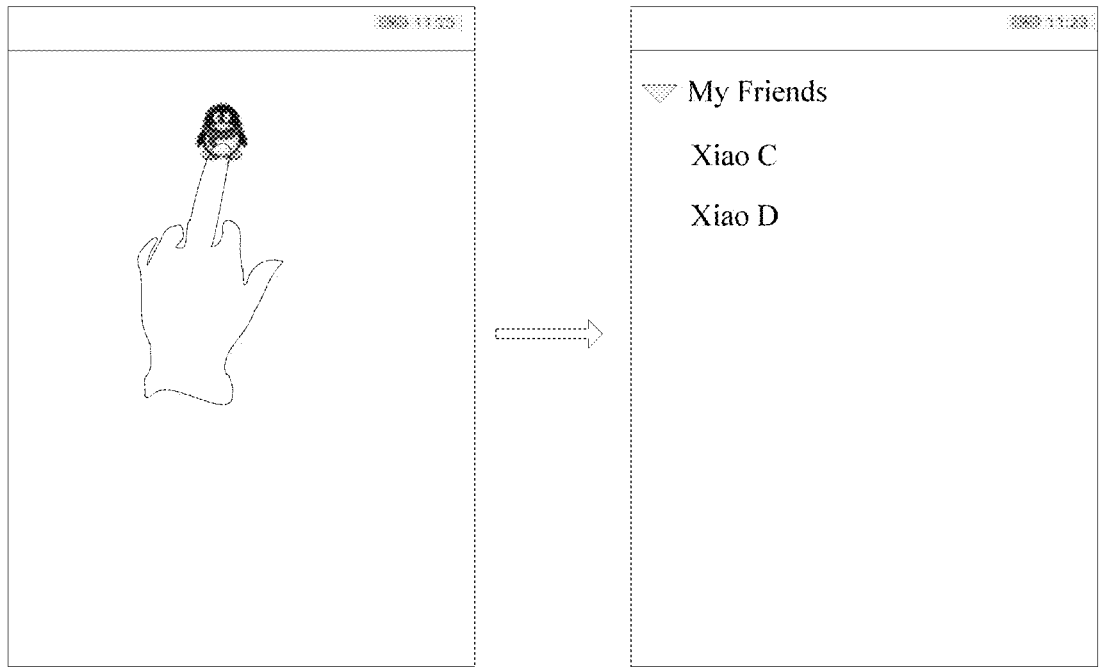
FIG. 5g is a diagram of an example in which a user interacts with an electronic device by using a finger instead of a right hand index finger according to an embodiment of this application.

As shown in FIG. 5g, FIG. 5g is a diagram of an example in which a user interacts with an electronic device by using a finger instead of a right hand index finger, such as a left hand middle finger. In the example, when the user touches the icon of the first application by using the left hand middle finger, the electronic device collects a fingerprint of the left hand middle finger by using a fingerprint sensor integrated into the touchscreen, compares the collected fingerprint with the foregoing three fingerprints, and when a comparison result indicates that the collected fingerprint does not match the fingerprint bound to the first user account, the electronic device selects, based on a historical login record of the second user account and a historical login record of the third user account, a user account that is most recently used for login. It is assumed that the selected user account is the second user account, and then information stored in a resource directory corresponding to the second user account is loaded. After the first application loads the information stored in the resource directory corresponding to the second user account, a displayed "My Friends" screen is shown in a right figure of FIG. 5g.

Figure 5H:
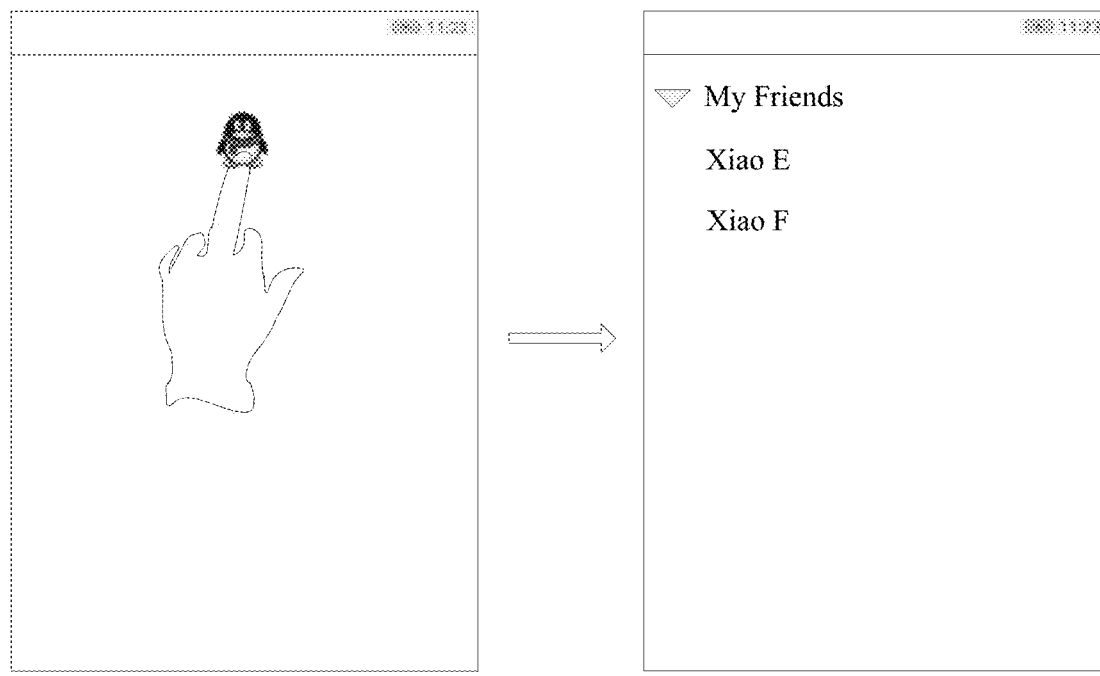
FIG. 5h is another diagram of an example in which a user interacts with an electronic device by using a finger instead of a right hand index finger according to an embodiment of this application.

In the example shown in FIG. 5g, when the collected fingerprint does not match the fingerprint bound to the first user account, the user account that is most recently used for login is selected from the second user account and the third user account to log in to the first application. As shown in FIG. 5h, FIG. 5h is another diagram of an example in which a user interacts with an electronic device by using a finger instead of a right hand index finger, such as a left hand middle finger. In the example, when the user touches the icon of the first application by using the left hand middle finger, the electronic device collects a fingerprint of the left hand middle finger by using a fingerprint sensor integrated into the touchscreen, compares the collected fingerprint with the foregoing three fingerprints, and when a comparison result indicates that the collected fingerprint does not match the fingerprint bound to the first user account, the electronic device selects, based on a login record of the second user account and a login record of the third user account, a user account that is most frequently used for login. It is assumed that the selected user account is the third user account, and then information stored in a resource directory corresponding to the third user account is loaded. After the first application loads the information stored in the resource directory corresponding to the third user account, a displayed "My Friends" screen is shown in a right figure of FIG. 5h.

Figure 5I:
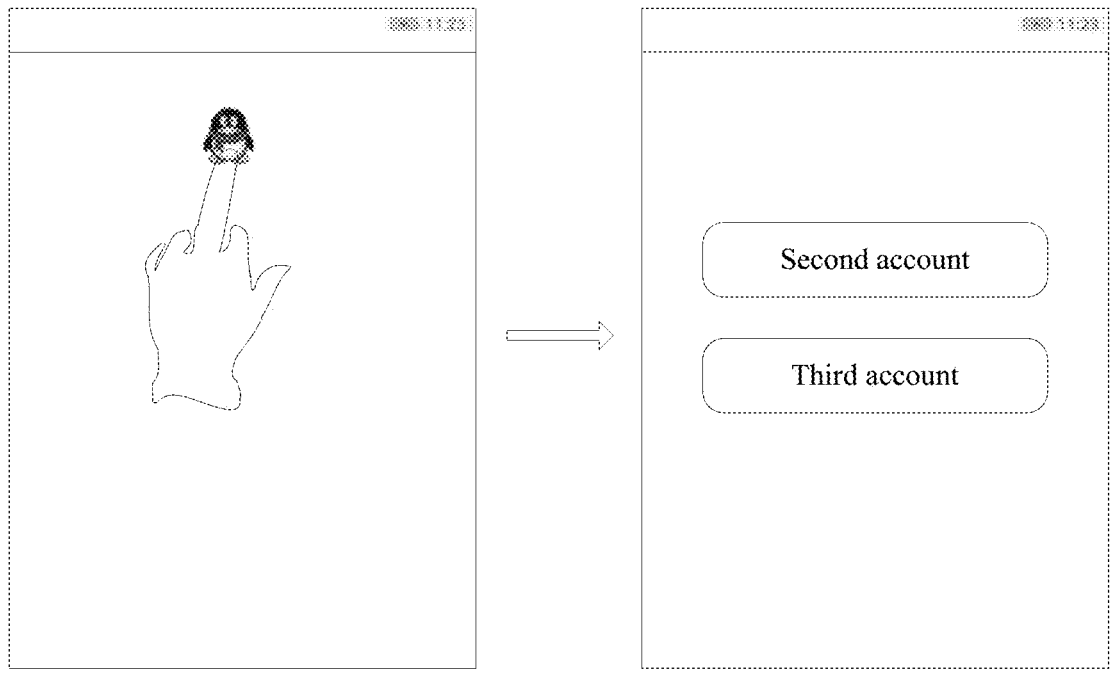
FIG. 5i is still another diagram of an example in which a user interacts with an electronic device by using a finger instead of a right hand index finger according to an embodiment of this application.

Different from the examples shown in FIG. 5g and FIG. 5h, as shown in FIG. 5i, FIG. 5i is still another diagram of an example in which a user interacts with an electronic device by using a finger instead of a right hand index finger, such as a left hand middle finger. In the example, when the user touches the icon of the first application by using the left hand middle finger, the electronic device collects a fingerprint of the left hand middle finger by using a fingerprint sensor integrated into the touchscreen, compares the collected fingerprint with the foregoing three fingerprints, and when a comparison result indicates that the collected fingerprint does not match the fingerprint bound to the first user account, the electronic device displays the second user account and the third user account, as shown in a right figure of FIG. 5h, and the user selects a desired user account for login.

Currently, a user may encrypt some files in a file library. The file library may be a folder that stores a plurality of files. The files stored in the file library may be a document, a picture, audio, a video, contacts, and the like, or may be a sub-file library including at least one of the foregoing files. One file library may store only one type of file, for example, store only a document, or store only a picture, or store only a video, or store only contacts. One file library may alternatively store a plurality of types of files at a same time, for example, store a picture, a video, and the like. A file library storing only a picture is used as an example. For ease of description, the file library storing only a picture is recorded as a picture library. A conventional manner of encrypting a picture in the picture library is establishing a public picture library and a private picture library. To be specific, a picture that needs to be encrypted in the picture library is stored to an encrypted picture library, and a picture that does not need to be encrypted is stored to an unencrypted picture library. When the user needs to open the private picture library, the user finds a location of the private picture library and clicks the private picture library, an electronic device displays an authentication screen, the user enters a password, and the electronic device performs authentication based on the password entered by the user, and displays a picture in the private picture library after authentication succeeds. When the user needs to open the public picture library, the user finds a location of the public picture library and clicks the public picture library, and a picture in the public picture library is displayed. User operations are relatively complicated.

To simplify the user operations, in an embodiment of this application, the file in the file library may be encrypted in the following manner.

Figure 6:
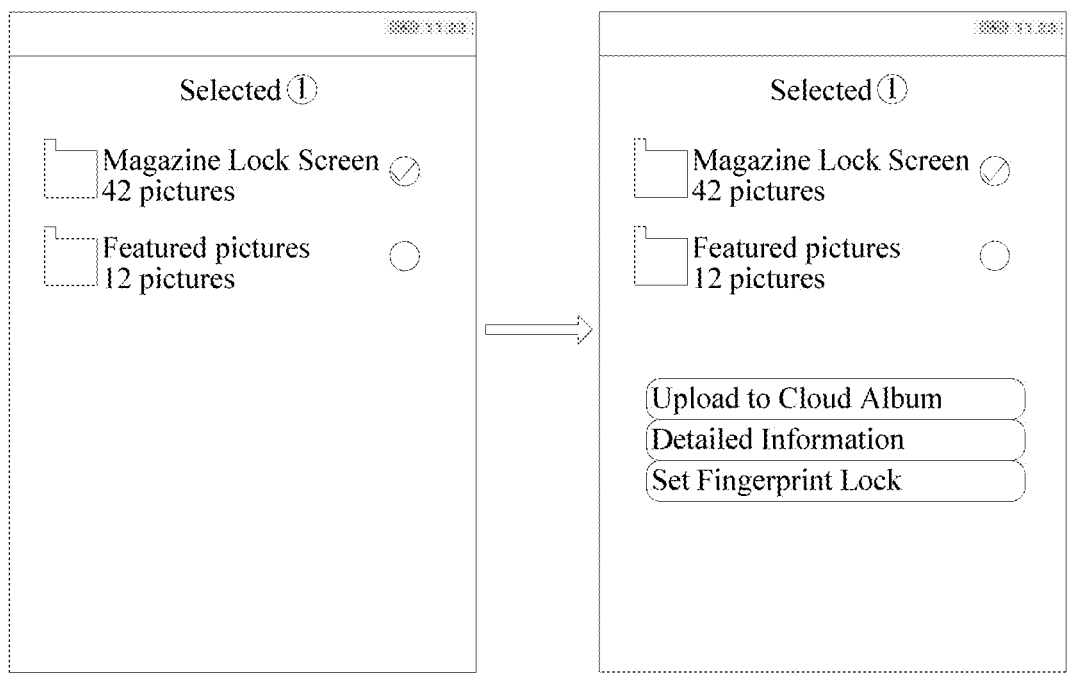
FIG. 6 is a diagram of an example of a process of encrypting a picture in a picture library according to an embodiment of this application.
Figure 7:
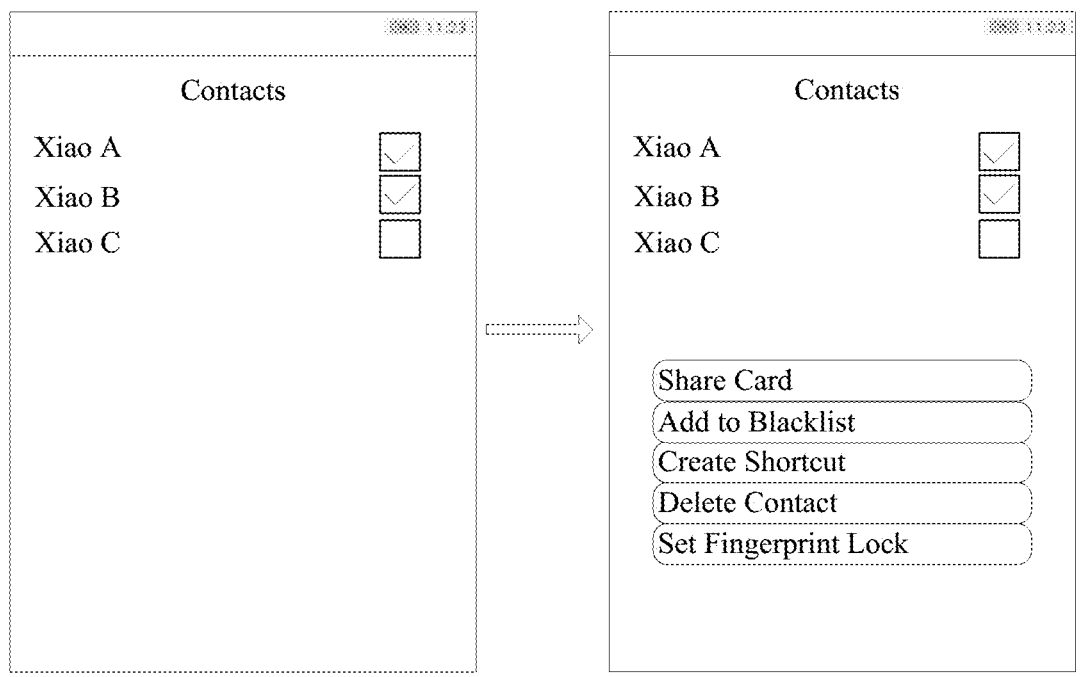
FIG. 7 is a diagram of an example of a process of encrypting contacts according to an embodiment of this application.

In an optional embodiment, the user may select, from the file library, an icon of at least one file that needs to be encrypted, and then trigger the electronic device to display an operation selection list, where the operation selection list includes at least a button that is used to trigger an encryption process for a selected file. As shown in FIG. 6, FIG. 6 is a diagram of an example of a process of encrypting a picture in a picture library according to an embodiment of this application. In the example shown in FIG. 6, a file selected by the user is a folder of "Magazine Lock Screen". After the folder is selected, the electronic device is triggered to display an operation selection list shown in a right figure of FIG. 6, where the button that is used to trigger an encryption process for a selected file is a "Set Fingerprint Lock" button. As shown in FIG. 7, FIG. 7 is a diagram of an example of a process of encrypting contacts according to an embodiment of this application. In the example shown in FIG. 7, contacts selected by the user are two contacts: "Xiao A" and "Xiao B". After the folder is selected, the electronic device is triggered to display an operation selection list shown in a right figure of FIG. 7, where a button that is used to trigger an encryption process for a selected contact is a "Set Fingerprint Lock" button.

In an optional embodiment, the user performs a touch operation by using the button, such as the "Set Fingerprint Lock" button in the foregoing example, for performing an encryption process on a selected file, to activate a fingerprint sensor. Then, the user enters a fingerprint. The fingerprint sensor may be an independent fingerprint sensor, or a fingerprint sensor integrated into a touchscreen.

After collecting the fingerprint of the user by using the fingerprint sensor, the electronic device binds the collected fingerprint to a file selected by the user. Because the file selected by the user belongs to the file library, binding the collected fingerprint to the file selected by the user is equivalent to binding the collected fingerprint to the file library. After binding the collected fingerprint to the file selected by the user, the electronic device hides an icon of the file selected by the user. In this case, only an icon of a file that is not selected by the user is displayed in the file library.

In another optional embodiment, the user performs a touch operation by using the button, such as the "Set Fingerprint Lock" button in the foregoing example, for performing an encryption process on a selected file, and the electronic device binds a pre-stored fingerprint that is used to unlock a screen of the electronic device to a file selected by the user.

In an optional embodiment, the user may encrypt different files in the file library by using different fingerprints. For example, the user may divide the files in the file library into three groups, where a first group of files are encrypted by using a first fingerprint, a second group of files are encrypted by using a second fingerprint, and a third group of files are encrypted by using a third fingerprint. Alternatively, a first group of files are encrypted by using a first fingerprint, a second group of files are encrypted by using a second fingerprint, and a third group of files are not encrypted.

Figure 8:
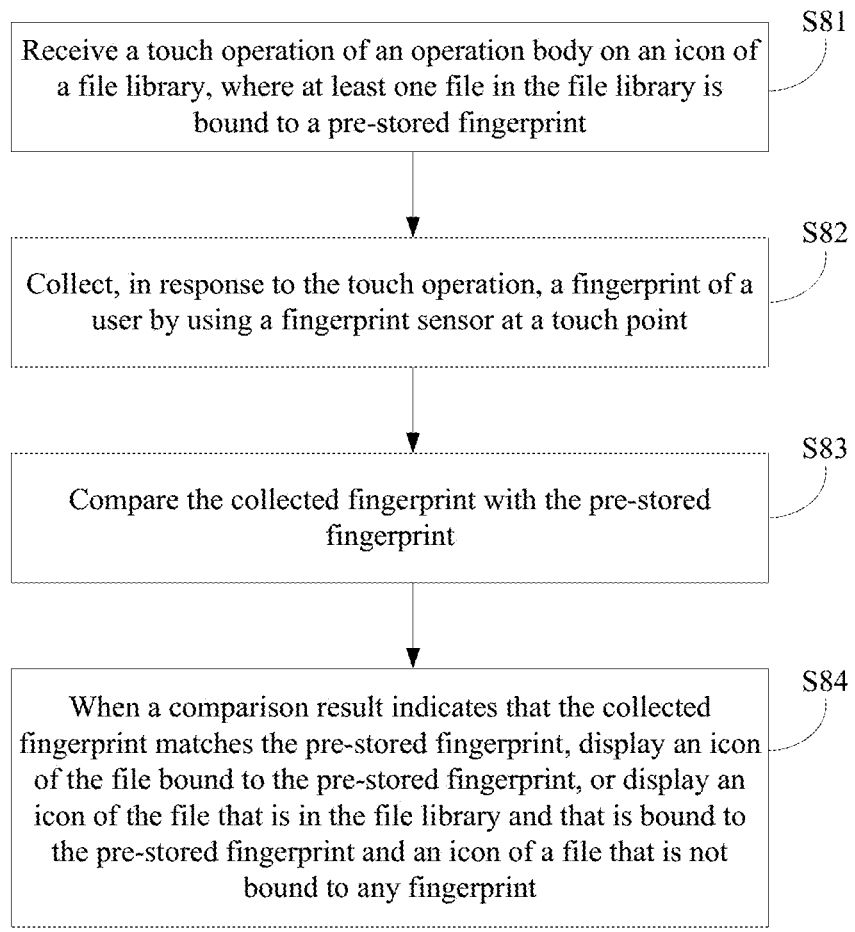
FIG. 8 is still another flowchart of implementing an authentication method according to an embodiment of this application.

Based on the foregoing encryption method, still another flowchart of implementing an authentication method provided in an embodiment of this application is shown in FIG. 8. The authentication method may include the following steps.

Step S81: Receive a touch operation of an operation body on an icon of a file library, where at least one file in the file library is bound to a pre-stored fingerprint.

In this embodiment of this application, all files in the file library may be bound to the pre-stored fingerprint, or one part of files in the file library may be bound to the pre-stored fingerprint, and the other part of files may not be bound to the pre-stored fingerprint. In other words, the one part of files are encrypted, and the other part of files are not encrypted.

Step S82: Collect, in response to the touch operation, a fingerprint of a user by using a fingerprint sensor at a touch point.

Step S83: Compare the collected fingerprint with the pre-stored fingerprint.

Step S84: When a comparison result indicates that the collected fingerprint matches the pre-stored fingerprint, display only an icon of the file bound to the pre-stored fingerprint, or display an icon of the file that is in the file library and that is bound to the pre-stored fingerprint and an icon of a file that is not bound to any fingerprint.

In an optional embodiment, if all the files in the file library are bound to the pre-stored fingerprint, when the comparison result indicates that the collected fingerprint matches the pre-stored fingerprint, icons of all the files in the file library are displayed. When the comparison result indicates that the collected fingerprint does not match the pre-stored fingerprint, prompt information is output, to prompt the user that authentication fails.

In another optional embodiment, if the one part of files in the file library are bound to the pre-stored fingerprint, and the other part of files are not bound to any fingerprint, when the comparison result indicates that the collected fingerprint matches the pre-stored fingerprint, only icons of the files bound to the pre-stored fingerprint are displayed. When the comparison result indicates that the collected fingerprint does not match the pre-stored fingerprint, only icons of the files that are not bound to any fingerprint are displayed. Based on this embodiment of this application, the user may operate the file library by using a finger with an encrypted fingerprint, so that only the icons of the encrypted files are displayed, or the user may operate the file library by using a finger without an encrypted fingerprint, so that only the icons of the files that are not bound to any fingerprint are displayed.

In still another optional embodiment, if the one part of files in the file library are bound to the pre-stored fingerprint, and the other part of files are not bound to any fingerprint, when the comparison result indicates that the collected fingerprint matches the pre-stored fingerprint, icons of all the files in the file library are displayed. When the comparison result indicates that the collected fingerprint does not match the pre-stored fingerprint, only icons of the files that are in the file library and that are not bound to any fingerprint are output. Based on this embodiment of this application, the user may operate the file library by using a finger with an encrypted fingerprint, so that the icons of all the files in the file library are displayed, or the user may operate the file library by using a finger without an encrypted fingerprint, so that only the icons of the files that are in the file library and that are not bound to any fingerprint are displayed.

According to the authentication method provided in this embodiment of this application, the user may choose to display an encrypted file or an unencrypted file in the file library by performing only one operation on the file library each time. The user no longer needs to first find a location of a private file library, perform an operation on the private file library, and then enter a password, so that user operations are simplified.

In an optional embodiment, the user may further group the files in the file library, and different groups are encrypted by using different fingerprints. Therefore, the user performs a touch operation on the file library by using different fingers, and icons of different groups of files can be displayed.

Figure 9:
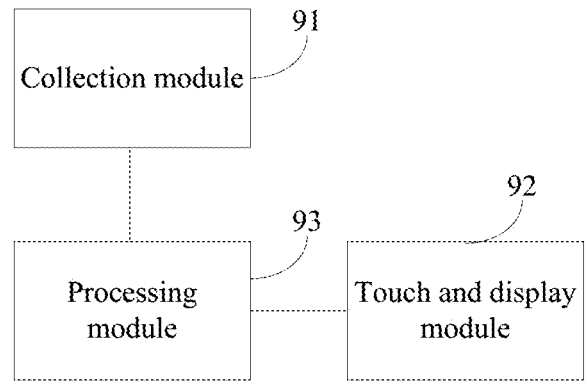
FIG. 9 is a schematic diagram of a partial structure of an electronic device according to an embodiment of this application.

Corresponding to the method embodiments, an embodiment of this application further provides an electronic device. As shown in FIG. 9, FIG. 9 is a schematic diagram of a partial structure of an electronic device according to an embodiment of this application. The electronic device may include a collection module 91, a touch and display module 92, and a processing module 93.

The collection module 91 is configured to collect a biological feature of a user.

The touch and display module 92 is configured to display an image, and is further configured to interact with an operation body.

The processing module 93 is configured to receive a touch operation of the operation body on an icon of a first application, control, in response to the touch operation, the collection module 91 to collect the biological feature of the user, compare the collected biological feature with a biological feature bound to the first application, and log in to the first application when a comparison result indicates that the collected biological feature matches the biological feature bound to the first application.

The operation body may be a device, such as a stylus, that is used cooperatively with the electronic device, or a finger of the user.

The first application is an application that is encrypted by using the biological feature of the user. In other words, the first application is bound to the biological feature of the user. The first application may be an application program, such as WeChat, Weibo, QQ, and Mailbox.

It should be noted that the electronic device not only can be used to perform authentication on an application, but also can be used to perform authentication on a file, such as a file library. The file library may include a folder, a document, a picture, audio, a video, and the like, and the folder may store at least one of the following files, including a sub-folder, a document, a picture, audio, a video, and the like.

According to the electronic device provided in this embodiment of this application, when the user performs the touch operation on the icon of the first application, the biological feature of the user is directly collected without displaying an authentication screen, the collected biological feature is compared with the biological feature bound to the first application, and the first application is logged in to when a comparison result indicates that the collected biological feature matches the biological feature bound to the first application. Based on the foregoing process, authentication can be implemented through only one interaction between the user and the electronic device, so that user operations are simplified.

In an optional embodiment, the first application is bound to at least one biological feature, each biological feature is bound to a user account of the first application, each user account is corresponding to a resource directory, different user accounts are corresponding to different resource directories, a quantity of user accounts is the same as a quantity of biological features, and that the processing module 93 is configured to log in to the first application when a comparison result indicates that the collected biological feature matches the biological feature bound to the first application may specifically include the processing module 93 is configured to, when the comparison result indicates that the collected biological feature matches a first biological feature of the at least one biological feature, determine a first user account bound to the first biological feature, and log in to the first application based on the first user account, so that the first application loads information stored in a first resource directory corresponding to the first user account.

In an optional embodiment, the first application further includes a user account that is not bound to any biological feature, and the processing module 93 may be further configured to, when the comparison result indicates that the collected biological feature does not match any biological feature bound to the first application, determine a second user account that meets a preset condition and that is not bound to any biological feature, and log in to the first application based on the second user account, so that the first application loads information stored in a second resource directory corresponding to the second user account.

In an optional embodiment, that the processing module 93 is configured to determine a second user account that meets a preset condition and that is not bound to any biological feature may specifically include the processing module 93 is configured to determine a user account that is most frequently used for login as the second user account based on a historical login record of the user account that is not bound to any biological feature.

In another optional embodiment, that the processing module 93 is configured to determine a second user account that meets a preset condition and that is not bound to any biological feature may specifically include the processing module 93 is configured to determine a user account that is most recently used for login as the second resource directory based on a historical login record of the user account that is not bound to any biological feature.

In still another optional embodiment, that the processing module 93 is configured to determine a second user account that meets a preset condition and that is not bound to any biological feature may specifically include the processing module 93 is configured to display, by using the touch and display module 92, the user account that is not bound to any biological feature, and determine the second resource directory depending on a user selection.

In an optional embodiment, the collection module 91 is an image capture unit, and that the processing module 93 is configured to collect, in response to the touch operation, the biological feature of the user by using the collection module includes the processing module 93 is configured to control, in response to the touch operation, the image capture unit to capture a facial image of the user.

Figure 10:
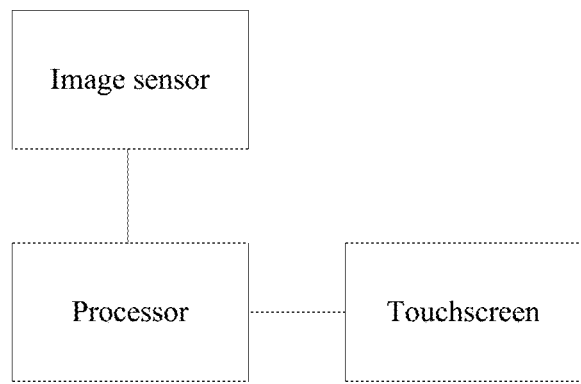
FIG. 10 is another schematic diagram of a partial structure of an electronic device according to an embodiment of this application.

In this embodiment of this application, the collection module 91 and the touch and display module 92 are two components in the electronic device that are independent of each other. As shown in FIG. 10, FIG. 10 is another schematic diagram of a partial structure of an electronic device according to an embodiment of this application. An image sensor is corresponding to the collection module 91, a touchscreen is corresponding to the touch and display module 92, and a processor is corresponding to the processing module 93.

Figure 11:
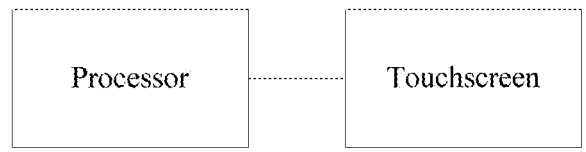
FIG. 11 is still another schematic diagram of a partial structure of an electronic device according to an embodiment of this application.

In another optional embodiment, the collection module 91 is a fingerprint sensor, where the fingerprint sensor is integrated into the touch and display module 92. In other words, the touch and display module 92 is a touchscreen into which the fingerprint sensor is integrated. As shown in FIG. 11, FIG. 11 is still another schematic diagram of a partial structure of an electronic device according to an embodiment of this application. A touchscreen is corresponding to the collection module 91 and the touch and display module 92, and a processor is corresponding to the processing module 93. Correspondingly, that the processing module 93 is configured to control, in response to the touch operation, the collection module 91 to collect the biological feature of the user may include the processing module 93 is configured to control, in response to the touch operation, the touch and display module 92 to collect, at a touch operation point, a fingerprint of the finger that performs the touch operation on the first application.

An example is used for description, and an electronic device provided in an embodiment of this application may include a collection module, configured to collect a biological feature of a user, a touch and display module, configured to display an image, and interact with an operation body, and a processing module, configured to receive a touch operation of the operation body on an icon of a file library, where at least one file in the file library is bound to a pre-stored biological feature, control, in response to the touch operation, the collection module to collect the biological feature of the user, compare the collected biological feature with the pre-stored biological feature, and when a comparison result indicates that the collected biological feature matches the pre-stored biological feature, open the file library, and control the touch and display module to display an icon of the file that is in the file library and that is bound to the pre-stored biological feature.

Further, the processing module may be further configured to, when the comparison result indicates that the collected biological feature does not match the pre-stored biological feature, open the file library, and control the touch and display module to display an icon of a file that is in the file library and that is not bound to the pre-stored biological feature.

That the processing module is configured to display an icon of the file that is in the file library and that is bound to the pre-stored biological feature may be specifically the processing module is configured to control the touch and display module to display only the icon of the file that is in the file library and that is bound to the pre-stored biological feature.

That the processing module is configured to display an icon of the file that is in the file library and that is bound to the pre-stored biological feature may be specifically the processing module is configured to control the touch and display module to display the icon of the file that is in the file library and that is bound to the pre-stored biological feature, and display an icon of a file that is in the file library and that is not bound to any biological feature.

In an optional example, the operation body is a finger of the user, the collection module is a fingerprint collection module, the fingerprint collection module is integrated into the touch and display module, and that the processing module is configured to collect, in response to the touch operation, the biological feature of the user may specifically include the processing module is configured to control, in response to the touch operation, the touch and display module to collect, at a touch operation point, a fingerprint of the finger that performs the touch operation on the icon of the file library.

Another example is used for description, and an electronic device provided in an embodiment of this application may include an image sensor, configured to capture a facial image of a user, a touchscreen, configured to display an image, and interact with an operation body, and a processor, configured to receive a touch operation of the operation body on an icon of a file library, where at least one file in the file library is bound to a pre-stored facial image, control, in response to the touch operation, the image sensor to capture the facial image of the user, compare the captured facial image with the pre-stored facial image, and when a comparison result indicates that the captured facial image matches the pre-stored facial image, open the file library, and control the touchscreen to display an icon of the file that is in the file library and that is bound to the pre-stored facial image.

Still another example is used for description, and an electronic device provided in an embodiment of this application may include a touchscreen, where a fingerprint sensor is integrated into the touchscreen, and the touchscreen is configured to display an image and interact with a finger of a user, and is capable of collecting a fingerprint of the user, and a processor, configured to receive a touch operation of the finger of the user on an icon of a file library, where at least one file in the file library is bound to a pre-stored fingerprint, control, in response to the touch operation, the touchscreen to collect a fingerprint of the finger that performs the touch operation on the icon of the file library, compare the collected fingerprint with the pre-stored fingerprint, and when a comparison result indicates that the collected fingerprint matches the pre-stored fingerprint, open the file library, and control the touchscreen to display an icon of the file that is in the file library and that is bound to the pre-stored fingerprint.

The following describes, by assuming that the electronic device is a mobile phone, a block diagram of a partial structure of a mobile phone 100 related to the embodiments of this application.

Figure 12:
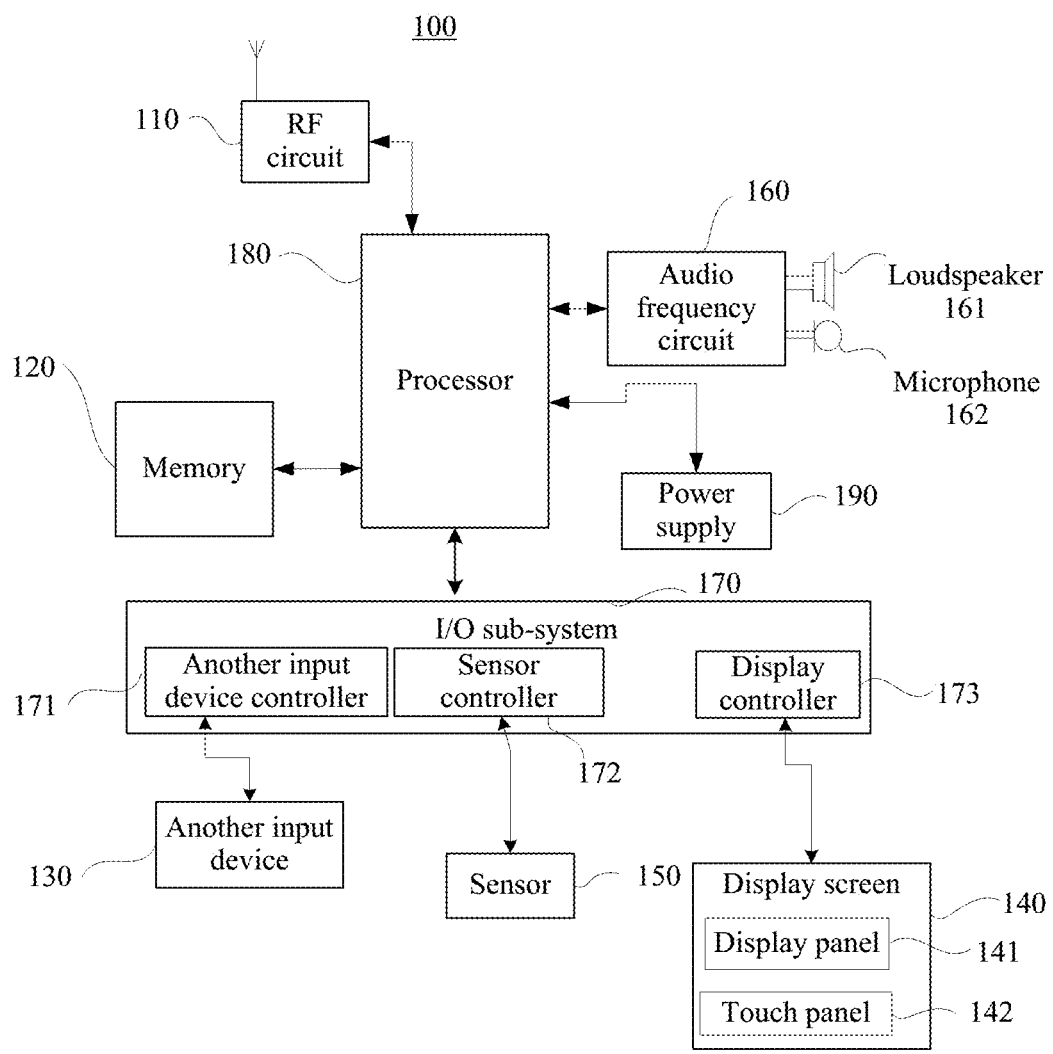
FIG. 12 is a block diagram of a partial structure of a mobile phone according to an embodiment of this application.

As shown in FIG. 12, the mobile phone 100 includes components such as an RF (Radio Frequency, radio frequency) circuit 110, a memory 120, another input device 130, a display screen 140, a sensor 150, an audio frequency circuit 160, an I/O sub-system 170, a processor 180, and a power supply 190. A person skilled in the art may understand that the structure of the mobile phone shown in FIG. 12 constitutes no limitation on the mobile phone, and the mobile phone may include more or fewer components than those shown in FIG. 12, or some components may be combined, or some components may be separated, or the components may be disposed in a different manner. A person skilled in the art may understand that the display screen 140 belongs to a user interface (User Interface, UI), and the mobile phone 100 may include more or fewer user interfaces than those shown in the figure.

The components of the mobile phone 100 are described in detail below with reference to FIG. 12.

The RF circuit 110 may be configured to receive and send a signal in an information receiving or sending process or a call process. In particular, the RF circuit 110 sends, after receiving downlink information of a base station, the downlink information to the processor 180 for processing, and sends uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 110 may further communicate with a network and another device through wireless communication, and the another device herein may be a wireless router, or the like. The wireless communication may be performed by using any communication standard or protocol, including but not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The memory 120 may be configured to store a software program and a module. The processor 180 runs the software program and the module stored in the memory 120, to execute all types of function applications and data processing of the mobile phone 100. The memory 120 may mainly include a program storage area and a data storage area. The program storage area may store an operating system, an application program required by at least one function (such as a sound playing function or an image playing function), and the like. The data storage area may store data (such as audio data or a phonebook) created based on use of the mobile phone 100, and the like. In addition, the memory 120 may include a high-speed random access memory, and may further include a non-volatile memory, for example, at least one magnetic disk storage component, a flash memory component, or another volatile solid-state storage component.

The another input device 130 may be configured to receive input digital or character information, and generate key signal input related to user settings and function control of the mobile phone 100. Specifically, the another input device 130 may include but is not limited to one or more of a physical keyboard, a function key (such as a volume control key or an on/off key), a trackball, a mouse, a joystick, an optical mouse (the optical mouse is a touch-sensitive surface not displaying visual output, or an extension of a touch-sensitive surface formed by a touchscreen), and the like. The another input device 130 is connected to another input device controller 171 of the I/O sub-system 170, and exchanges a signal with the processor 180 under control of the another device input controller 171.

The display screen 140 may be configured to display information input by a user or information provided for a user, and various menus of the mobile phone 100, and may also accept user input. Specifically, the display screen 140 may include a display panel 141 and a touch panel 142. The display panel 141 may be configured in a form of a liquid crystal display (Liquid Crystal Display, LCD), an organic light-emitting diode (Organic Light-Emitting Diode, OLED), or the like.

The touch panel 142, also referred to as a touchscreen, a touch-sensitive screen, or the like, may collect a touch or non-touch operation of the user on or near the touch panel 142 (for example, an operation performed by the user on the touch panel 142 or near the touch panel 142 by using any suitable object or accessory such as a finger or a stylus, where a motion sensing operation may be further included, and the operation includes an operation type such as a single-point control operation or a multi-point control operation), and drive a corresponding connection apparatus based on a preset program. Optionally, the touch panel 142 may include two components: a touch detection apparatus and a touch controller. The touch detection apparatus detects a touch orientation and a gesture of the user, detects a signal brought by a touch operation, and transfers the signal to the touch controller. The touch controller receives touch information from the touch detection apparatus, converts the information into information that can be processed by the processor, and then sends the information to the processor 180, and can receive and execute a command sent by the processor 180. In addition, the touch panel 142 may be implemented in a plurality of types, such as a resistive type, a capacitive type, an infrared type, and a surface acoustic wave type, or the touch panel 142 may be implemented by using any technology developed in the future. Further, the touch panel 142 may cover the display panel 141. The user may perform, based on content displayed by the display panel 141 (the displayed content includes but is not limited to a soft keyboard, a virtual mouse, a virtual key, an icon, and the like), an operation on or near the touch panel 142 that covers the display panel 141. After detecting the operation on or near the touch panel 142, the touch panel 142 transfers the operation to the processor 180 by using the I/O sub-system 170, to determine user input. Then, the processor 180 provides corresponding visual output on the display panel 141 based on the user input by using the I/O sub-system 170. In FIG. 12, the touch panel 142 and the display panel 141 are used as two independent components to implement input and input functions of the mobile phone 100. However, in some embodiments, the touch panel 142 and the display panel 141 may be integrated to implement the input and output functions of the mobile phone 100.

The mobile phone 100 may further include at least one sensor 150, for example, a light sensor, a motion sensor, a fingerprint sensor, and another sensor. Specifically, the light sensor may include an ambient light sensor and a proximity sensor. The ambient light sensor may adjust luminance of the display panel 141 based on brightness of ambient light, and the proximity sensor may turn off the display panel 141 and/or backlight when the mobile phone 100 moves to an ear. As a motion sensor, an accelerometer sensor may detect accelerations in all directions (three axes generally), may detect a magnitude and a direction of gravity at rest, and may be applied to an application that recognizes a mobile phone posture (such as screen switching between portrait and landscape modes, a related game, and magnetometer posture calibration), a function related to vibration recognition (such as a pedometer or a knock), and the like. The fingerprint sensor may collect a fingerprint of the user. For other sensors such as a gyroscope, a barometer, a hygrometer, a thermometer, and an infrared sensor that can also be configured on the mobile phone 100, details are not described herein. The fingerprint sensor may be integrated into the touch panel 142. For example, the fingerprint sensor may be integrated below the touch panel 142.

The audio frequency circuit 160, a loudspeaker 161, and a microphone 162 may provide an audio interface between the user and the mobile phone 100. The audio frequency circuit 160 may transmit a signal converted from received audio data to the loudspeaker 161, and the loudspeaker 161 converts the signal into an audio signal for output. In addition, the microphone 162 converts a collected audio signal into an electrical signal. The audio frequency circuit 160 receives the electrical signal, converts the electrical signal into audio data, and then outputs the audio data to the RF circuit 110, so as to send the audio data to, for example, another mobile phone, or outputs the audio data to the memory 120 for further processing.

The I/O sub-system 170 is configured to control an input/output external device, and may include the another device input controller 171, a sensor controller 172, and a display controller 173. Optionally, one or more another input control device controllers 171 receive a signal from the another input device 130 and/or send a signal to the another input device 130, and the another input device 130 may include a physical button (a push button, a rocker arm button, and the like), a dial, a slider switch, a joystick, a click scroll wheel, and an optical mouse (the optical mouse is a touch-sensitive surface not displaying visual output, or an extension of a touch-sensitive surface formed by the touch-screen). It should be noted that the another input control device controller 171 may be connected to any one or more of the foregoing devices. The display controller 173 in the I/O sub-system 170 receives a signal from the display screen 140 and/or sends a signal to the display screen 140. After the display screen 140 detects user input, the display controller 173 converts the detected user input into interaction with a user interface object displayed on the display screen 140, namely, implements human computer interaction. The sensor controller 172 may receive a signal from one or more sensors 150 and/or send a signal to one or more sensors 150.

The processor 180 is a control center of the mobile phone 100, connects all components of the whole mobile phone by using all types of interfaces and circuits, and executes functions of the mobile phone 100 and processes data by running or executing the software program and/or module stored in the memory 120 and calling data stored in the memory 120, so as to perform overall monitoring on the mobile phone. Optionally, the processor 180 may include one or more processing units. Preferably, an application processor and a modem processor may be integrated into the processor 180, where the application processor mainly processes an operating system, a user interface, an application program, and the like, and the modem processor mainly processes wireless communication. It may be understood that the modem processor may not be integrated into the processor 180. The processor 182 may execute program code of the following steps, including receiving a touch operation of a finger of the user on an icon of a first application, controlling, in response to the touch operation, the touch panel 142 into which the fingerprint sensor is integrated, to collect a fingerprint of the finger that performs the touch operation on the icon of the first application, comparing the collected fingerprint with a fingerprint bound to the first application, and logging in to the first application when a comparison result indicates that the collected fingerprint matches the fingerprint bound to the first application. Further, the first application is bound to at least one fingerprint, each fingerprint is bound to a user account of the first application, each user account is corresponding to a resource directory, different user accounts are corresponding to different resource directories, a quantity of user accounts is the same as a quantity of fingerprints, and that the processor 182 is configured to log in to the first application when a comparison result indicates that the collected fingerprint matches the fingerprint bound to the first application includes the processor 182 is configured to, when the comparison result indicates that the collected fingerprint matches a first fingerprint of the at least one fingerprint, determine a first user account bound to the first fingerprint, and log in to the first application based on the first user account, so that the first application loads information stored in a first resource directory corresponding to the first user account. Further, the first application further includes a user account that is not bound to any biological feature, and the processor 182 is further configured to, when the comparison result indicates that the collected biological feature does not match any biological feature bound to the first application, determine a second user account that meets a preset condition and that is not bound to any biological feature, and log in to the first application based on the second user account, so that the first application loads information stored in a second resource directory corresponding to the second user account.

The mobile phone 100 further includes the power supply 190 (for example, a battery) that supplies power to each component. Preferably, the power supply may be logically connected to the processor 180 by using a power management system, so that functions such as charging, discharging, and power consumption management are implemented by using the power management system.

Although not shown, a camera, a Bluetooth module, and the like may be further included in the mobile phone 100, and details are not described herein.

It may be clearly understood by a person skilled in the art that, for the purpose of convenient and brief description, for a detailed working process of the foregoing module, reference may be made to a corresponding process in the foregoing method embodiments, and details are not described herein again.

The embodiments disclosed above are described to enable a person skilled in the art to implement or use this application. Various modifications made to the embodiments are obvious to a person skilled in the art, and the general principles defined in this specification may also be implemented in other embodiments without departing from the spirit or scope of this application. Therefore, this application is not limited to these embodiments described in this specification, but shall be construed in a widest scope consistent with the principles and novel features disclosed in this specification.

What is claimed is:

1. A terminal, comprising:
   at least one processor; and
   a non-transitory computer-readable storage medium storing a program to be executed by the at least one processor, the program including instructions to:
     receive a touch operation on an icon of a first application displayed on the terminal;
     collect a biological feature of a user in response to the touch operation;
     compare the collected biological feature with at least one biological feature bound to the first application, wherein each biological feature of the at least one biological feature is bound to a user account of the first application, and wherein each user account corresponds to a resource directory;
     determine a first user account bound to a first biological feature of the at least one biological feature in response to a comparison result of the comparing the collected biological feature with the at least one biological feature indicating that the collected biological feature matches the first biological feature;
     log in to the first application according to the first user account, and load information stored in a first resource directory corresponding to the first user account in response to determining the first user account is bound to the first biological feature of the at least one biological feature;
     determine a second user account that meets a preset condition and that is not bound to any biological feature in response to the comparison result indicating that the collected biological feature does not match the first biological feature of the at least one biological feature; and
     log in to the first application according to the second user account, and load information stored in a second resource directory corresponding to the second user account in response to determining the second user account that meets the preset condition and that is not bound to any biological feature.

2. The terminal of claim 1, wherein the instructions to determine the second user account include instructions to:
   determine, according to a historical login record of the user account that is not bound to any biological feature, a user account that is most frequently used for login as the second user account.

3. The terminal of claim 1, wherein the instructions to determine the second user account include instructions to:
   determine, according to a historical login record of the user account that is not bound to any biological feature, a user account that is most recently used for login as the second user account.

4. The terminal of claim 1, wherein the instructions to collect the biological feature of the user in response to the touch operation include instructions to:
   control, in response to the touch operation, an image capture unit to capture a facial image of the user.

5. The terminal of claim 1, wherein the instructions to collect the biological feature of the user in response to the touch operation include instructions to:
   collect, in response to the touch operation, a fingerprint of a finger that performs the touch operation on the icon of the first application.

6. The terminal of claim 1, wherein the program further includes instructions to:
- display a first user interface element corresponding to the first application and a second user interface element corresponding to the first application; and
- receive a selection input on the first user interface element, and bind a collected fingerprint to a user account of the first application.

7. An authentication method, comprising:
- receiving a touch operation on an icon of a first application displayed on a terminal;
- collecting a biological feature of a user in response to the touch operation;
- comparing the collected biological feature with at least one biological feature bound to the first application, wherein each biological feature of the at least one biological feature is bound to a user account of the first application, and wherein each user account corresponds to a resource directory;
- determining a first user account bound to a first biological feature of the at least one biological feature in response to a comparison result of the comparing the collected biological feature with the at least one biological feature indicating that the collected biological feature matches the first biological feature;
- logging in to the first application according to the first user account, and loading information stored in a first resource directory corresponding to the first user account in response to determining the first user account is bound to the first biological feature of the at least one biological feature;
- determining a second user account that meets a preset condition and that is not bound to any biological feature in response to the comparison result indicating that the collected biological feature does not match the first biological feature of the at least one biological feature; and
- logging in to the first application according to the second user account, and load information stored in a second resource directory corresponding to the second user account in response to determining the second user account that meets the preset condition and that is not bound to any biological feature.

8. The method of claim 7, wherein the determining the second user account comprises:
- determining, according to a historical login record of the user account that is not bound to any biological feature, a user account that is most frequently used for login as the second user account.

9. The method of claim 7, wherein the determining the second user account comprises:
- determining, according to a historical login record of the user account that is not bound to any biological feature, a user account that is most recently used for login as the second user account.

10. The method of claim 7, wherein the collecting the biological feature of the user in response to the touch operation comprises:
- controlling, in response to the touch operation, an image capture unit to capture a facial image of the user.

11. The method of claim 7, wherein the collecting the biological feature of the user in response to the touch operation comprises:
- collecting, in response to the touch operation, a fingerprint of a finger that performs the touch operation on the icon of the first application.

12. The method of claim 7, further comprising:
- displaying a first user interface element corresponding to the first application and a second user interface element corresponding to the first application; and
- receiving a selection input on the first user interface element, and binding a collected fingerprint to a user account of the first application.

13. A non-transitory computer-readable storage medium having computer-readable program code stored therein, the program code comprising instructions that, when executed by a processor of a terminal, cause the terminal to:
- receive a touch operation on an icon of a first application displayed on the terminal;
- collect a biological feature of a user in response to the touch operation;
- compare the collected biological feature with at least one biological feature bound to the first application, wherein each biological feature of the at least one biological feature is bound to a user account of the first application, and wherein each user account corresponds to a resource directory;
- determine a first user account bound to a first biological feature of the at least one biological feature in response to a comparison result of the comparing the collected biological feature with the at least one biological feature indicating that the collected biological feature matches the first biological feature; and
- log in to the first application according to the first user account, and load information stored in a first resource directory corresponding to the first user account in response to determining the first user account is bound to the first biological feature of the at least one biological feature;
- determine a second user account that meets a preset condition and that is not bound to any biological feature in response to the comparison result indicating that the collected biological feature does not match the first biological feature of the at least one biological feature; and
- log in to the first application according to the second user account, and load information stored in a second resource directory corresponding to the second user account in response to determining the second user account that meets the preset condition and that is not bound to any biological feature.

14. The non-transitory computer-readable storage medium of claim 13, wherein the instructions to determine the second user account include instructions to:
- determine, according to a historical login record of the user account that is not bound to any biological feature a user account that is most frequently used for login as the second user account.

15. The non-transitory computer-readable storage medium of claim 13, wherein the instructions to determine the second user account include instructions to:
- determine, according to a historical login record of the user account that is not bound to any biological feature, a user account that is most recently used for login as the second user account.

16. The non-transitory computer-readable storage medium of claim 13, wherein the instructions to collect the biological feature of the user in response to the touch operation include instructions to:
- control, in response to the touch operation, an image capture unit to capture a facial image of the user.

17. The non-transitory computer-readable storage medium of claim 13, wherein the instructions to collect the biological feature of the user in response to the touch operation include instructions to:
  collecting, in response to the touch operation, a fingerprint of a finger that performs the touch operation on the icon of the first application.

\* \* \* \* \*